United States Patent
Breed

(10) Patent No.: US 6,919,803 B2
(45) Date of Patent: Jul. 19, 2005

(54) LOW POWER REMOTE ASSET MONITORING

(75) Inventor: David S. Breed, Boonton Township, Morris County, NJ (US)

(73) Assignee: Intelligent Technologies International Inc., Denville, NJ (US)

( * ) Notice: Subject to any disclaimer, the term of this patent is extended or adjusted under 35 U.S.C. 154(b) by 0 days.

(21) Appl. No.: 10/457,238

(22) Filed: Jun. 9, 2003

(65) Prior Publication Data

US 2003/0227382 A1 Dec. 11, 2003

Related U.S. Application Data

(60) Provisional application No. 60/387,792, filed on Jun. 11, 2002.

(51) Int. Cl.[7] .................................................. G08B 1/08
(52) U.S. Cl. ............................ 340/539.14; 340/426.19; 340/568.1; 340/539.1; 340/540; 340/825.36; 340/825.49; 342/457; 705/22
(58) Field of Search .......................... 340/539.1, 426.19, 340/540, 541, 989, 539.13, 539.26, 10.1, 825.36, 825.49, 572.1, 572.3, 572.4, 568.1; 342/457, 42, 44, 46; 705/22; 235/385; 701/1

(56) References Cited

U.S. PATENT DOCUMENTS

| | | | | |
|---|---|---|---|---|
| 4,750,197 A | * | 6/1988 | Denekamp et al. ........... 379/58 |
| 5,917,433 A | * | 6/1999 | Keillor et al. ............... 340/989 |
| 5,969,595 A | * | 10/1999 | Schipper et al. ............ 340/426 |
| 6,069,570 A | * | 5/2000 | Herring .................. 340/825.49 |
| 6,236,911 B1 | * | 5/2001 | Kruger .......................... 701/1 |
| 6,429,810 B1 | * | 8/2002 | De Roche .............. 342/357.07 |
| 6,437,702 B1 | * | 8/2002 | Ragland et al. .......... 340/686.1 |

* cited by examiner

*Primary Examiner*—Davetta W. Goins
(74) *Attorney, Agent, or Firm*—Brian Roffe

(57) ABSTRACT

Arrangement for monitoring an asset including an interior sensor system arranged on the asset to obtain information about contents in the interior of the asset, a location determining system arranged on the asset to monitor the location of the asset and a communication system arranged on the asset and coupled to the interior sensor system and the location determining system. The communication system operatively transmits the information about the contents in the interior of the asset and the location of the asset to a remote facility. The interior sensor system may include at least one wave transmitter arranged to transmit waves into the interior of the asset and at least one wave receiver arranged to receive waves from the interior of the asset. A processor may be provided to compare waves received by the wave receiver(s) at different times or analyze the waves received by the wave receiver(s).

55 Claims, 5 Drawing Sheets

LOW POWER REMOTE ASSET MONITORING

CROSS-REFERENCE TO RELATED APPLICATION

This application claims the benefit of U.S. provisional patent application Ser. No. 60/387,792 filed Jun. 11, 2002 under 35 U.S.C. §119(e).

FIELD OF THE INVENTION

The present invention relates to systems for remotely monitoring transportation assets and other movable and/or stationary items which have very low power requirements. In particular, the present invention relates to a system for attachment to shipping containers and other transportation assets which enables remote monitoring of the location, contents, properties and/or interior or exterior environment of shipping containers or other assets and transportation assets and since it has a low power requirement, lasts for years without needing maintenance.

The present invention also relates to a tracking method and system for tracking shipping containers and other transportation assets and enabling recording of the travels of the shipping container or transportation asset.

BACKGROUND OF THE INVENTION

Many issues are now arising that render a low power remote asset monitoring system desirable. Some of these issues developed from the terrorist threat to the United States since Sep. 11, 2001, and the concern of anti-terrorist personnel with the relatively free and unmonitored transportation of massive amounts of material throughout the United States by trains, trucks, and ships. A system that permits monitoring of the contents of these shipping containers could substantially reduce this terrorist threat.

The FBI has recently stated that cargo crime is conservatively estimated at about $12 billion per year. It is the fastest growing crime problem in the United States. Other areas of criminal activity involve shipments imported into the United States that are used to conceal illegal goods including weapons, illegal immigrants, narcotics, and products that violate trademarks and patents. The recent concern on the potential use of cargo containers as weapons of mass destruction is also causing great pressure to improve information, inspection, tracking and monitoring technologies. Furthermore, the movement of hazardous cargo and the potential for sabotage is also causing increased concern among law enforcement agencies and resulting in increasing demands for security for such hazardous cargo shipments.

A low cost low power monitoring system of cargo containers and their contents could substantially solve these problems.

Cargo security is defined as the safe and reliable intermodal movement of goods from the shipper to the eventual destination with no loss due to theft or damage. Cargo security is concerned with the key assets that move the cargo including containers, trailers, chassis, tractors, vessels and rail cars as well as the cargo itself. Modern manufacturing methods requiring just-in-time delivery further places a premium on cargo security.

The recent increase in cargo theft and the concern for homeland security are thus placing new demands on cargo security and because of the large number of carriers and storage locations, inexpensive systems are needed to continuously monitor the status of cargo from the time that it leaves the shipper until it reaches its final destination. Technological advancements such as the global positioning system (GPS), and improved communication systems, including wireless telecommunications via satellites, and the Internet have created a situation where such an inexpensive system is now possible.

To partially respond to these concerns, projects are underway to remotely monitor the geographic location of shipping containers as well as the tractors and chassis, boats, planes and railroad cars that move these containers or cargo in general. The ability exists now for communicating limited amounts of information from shipping containers directly to central computers and the Internet using satellites and other telematics communication devices.

In some prior art systems, cargo containers are sealed with electronic cargo seals, the integrity of which can be remotely monitored. Knowledge of the container's location as well as the seal integrity are vital pieces of information that can contribute to solving the problems mentioned above. However, this is not sufficient and the addition of various sensors and remote monitoring of these sensors is now not only possible but necessary.

Emerging technology now permits the monitoring of some safety and status information on the chassis such as tire pressures, brake system status, lights, geographical location, generator performance, and container security and this information can now be telecommunicated to a remote location. This invention is concerned with these additional improvements to the remote reporting system.

Additionally, biometric information can be used to validate drivers of vehicles containing hazardous cargo to minimize terrorist activities involving these materials. This data needs to be available remotely especially if there is a sudden change in drivers. Similarly, any deviation from the authorized route can now be detected and this also needs to be remotely reported. Much of the above-mentioned prior art activity is in bits and pieces, that is, it is available on the vehicle and sometimes to the dispatching station while the vehicle is on the premises. It now needs to be available to a central monitoring location at all times. Homeland security issues arising out the components that make up the cargo transportation system including tractors, trailers, chassis, containers and railroad cars, will only be eliminated when the contents of all such elements are known, monitored, and thus the misappropriation of such assets eliminated. The shipping system or process that takes place in the United States should guarantee that all shipping containers contain only the appropriate contents and are always on the proper route from their source to their destination and on schedule. This invention is concerned with achieving this 100 percent system primarily through low power remote monitoring of the assets that make up the shipping system.

The system that is described herein for monitoring shipping assets and the contents of shipping containers can also be used for a variety of other asset monitoring problems including the monitoring of unattended boats, cabins, summer homes, private airplanes, sheds, warehouses, storage facilities and other remote unattended facilities. With additional sensors, the quality of the environment, the integrity of structures, the presence of unwanted contaminants etc. can also now be monitored and reported on an exception basis through a low power, essentially maintenance-free monitoring and reporting system in accordance with the invention as described herein.

Definitions

Preferred embodiments of the invention are described below and unless specifically noted, it is the applicants' intention that the words and phrases in the specification and claims be given the ordinary and accustomed meaning to those of ordinary skill in the applicable art(s). If the applicant intends any other meaning, he will specifically state he is applying a special meaning to a word or phrase.

Likewise, applicants' use of the word "function" here is not intended to indicate that the applicants seek to invoke the special provisions of 35 U.S.C. §112, sixth paragraph, to define their invention. To the contrary, if applicants wish to invoke the provisions of 35 U.S.C. §112, sixth paragraph, to define their invention, they will specifically set forth in the claims the phrases "means for" or "step for" and a function, without also reciting in that phrase any structure, material or act in support of the function. Moreover, even if applicants invoke the provisions of 35 U.S.C. §112, sixth paragraph, to define their invention, it is the applicants' intention that their inventions not be limited to the specific structure, material or acts that are described in the preferred embodiments herein. Rather, if applicants claim their inventions by specifically invoking the provisions of 35 U.S.C. §112, sixth paragraph, it is nonetheless their intention to cover and include any and all structure, materials or acts that perform the claimed function, along with any and all known or later developed equivalent structures, materials or acts for performing the claimed function.

"Pattern recognition" as used herein will generally mean any system which processes a signal that is generated by an object (e.g., representative of a pattern of returned or received impulses, waves or other physical property specific to and/or characteristic of and/or representative of that object) or is modified by interacting with an object, in order to determine to which one of a set of classes that the object belongs. Such a system might determine only that the object is or is not a member of one specified class, or it might attempt to assign the object to one of a larger set of specified classes, or find that it is not a member of any of the classes in the set. The signals processed are generally a series of electrical signals coming from transducers that are sensitive to acoustic (ultrasonic) or electromagnetic radiation (e.g., visible light, infrared radiation, radar, or any other frequency), although other sources of information including information from capacitance and electric field sensors are frequently included.

A trainable or a trained pattern recognition system as used herein generally means a pattern recognition system which is taught to recognize various patterns constituted within the signals by subjecting the system to a variety of examples. The most successful such system is the neural network or modular neural network. Thus, to generate the pattern recognition algorithm, test data is first obtained which constitutes a plurality of sets of returned waves, or wave patterns or other data, from an object (or from the space in which the object will be situated in the container or other storage facility or asset, e.g., the space in a truck or container) and an indication of the identity of that object, (e.g., a number of different objects are tested to obtain the unique wave patterns from each object). As such, the algorithm is generated, and stored in a computer processor, and which can later be applied to provide the identity of an object based on the wave or other pattern being received during use by a receiver connected to the processor and other information. For the purposes here, the identity of an object sometimes applies to not only the object itself but also to its location and/or orientation in a compartment, container or storage facility. For example, a rear facing child seat is a different object than a forward facing child seat, an out-of-position adult is a different object than a normally seated adult and an open container door is a different object than a closed container door.

Other means of pattern recognition exist where the training is done by the researcher including fuzzy logic and sensor fusion systems.

To "identify" as used herein will generally mean to determine that the object belongs to a particular set or class. The class may be one containing, for example, all rear facing child seats, one containing all human occupants, or all human occupants not sitting in a rear facing child seat or a box equal to or larger than a particular size depending on the purpose of the system. In the case where a particular person is to be recognized, the set or class will contain only a single element, i.e., the person to be recognized.

To "ascertain the identity of" as used herein with reference to an object will generally mean to determine the type or nature of the object (obtain information as to what the object is), i.e., that the object is a box, an adult, an occupied rear facing child seat, an occupied front facing child seat, an unoccupied rear facing child seat, an unoccupied front facing child seat, a child, a dog, a bag of groceries, etc.

"Transducer" as used herein will sometimes mean the combination of a transmitter and a receiver. In some cases, the same device will serve both as the transmitter and receiver while in others two separate devices adjacent to each other will be used. In some cases, a transmitter is not used and in such cases transducer will mean only a receiver. Transducers include, for example, capacitive, inductive, ultrasonic, electromagnetic (antenna, CCD, CMOS arrays), weight measuring, temperature, acceleration, chemical, sound or other sensing devices.

"Adaptation" as used herein represents the method by which a particular sensing system is designed and arranged for a particular vehicle container or other object. It includes such things as the process by which the number, kind and location of various transducers is determined. For pattern recognition systems, it includes the process by which the pattern recognition system is taught to recognize the desired patterns. In this connection, it will usually include (1) the method of training, (2) the makeup of the databases used for training, testing and validating the particular system, or, in the case of a neural network, the particular network architecture chosen, (3) the process by which environmental influences are incorporated into the system, and (4) any process for determining the pre-processing of the data or the post processing of the results of the pattern recognition system. The above list is illustrative and not exhaustive. Basically, adaptation includes all of the steps that are undertaken to adapt transducers and other sources of information to a particular vehicle, container, storage facility, structure or other object to create the system that accurately identifies and determines the location of an object in a vehicle, container or other object, for example.

For the purposes herein, a "neural network" is defined to include all such learning systems including cellular neural networks, support vector machines and other kernel-based learning systems and methods, cellular automata and all other pattern recognition methods and systems that learn. A "combination neural network" as used herein will generally apply to any combination of two or more neural networks that are either connected together or that analyze all or a portion of the input data. A combination neural network can be used to divide up tasks in solving a particular pattern recognition problem. For example, one neural network can be used to identify an object occupying a passenger compartment of an automobile or a shipping container and a second neural network can be used to determine the position of the object or its location with respect to the airbag or end of the container, for example, within the passenger compartment or container respectively. In another case, one neural network can be used merely to determine whether the data is similar to data upon which a main neural network has been trained or whether there is something radically different about this data and therefore that the data should not be analyzed. Combination neural networks can sometimes be implemented as cellular neural networks.

OBJECTS AND SUMMARY OF THE INVENTION

It is an object of the present invention to provide new and improved systems for remotely monitoring transportation assets and other movable and/or stationary items which have very low power requirements.

It is another object of the present invention to provide new and improved systems for attachment to shipping containers and other transportation assets which enable remote monitoring of the location, contents and/or interior or exterior environment of shipping containers or other assets and transportation assets and since it has a low power requirement, lasts for years without needing maintenance.

It is yet another object of the invention to provide new and improved tracking methods and systems for tracking shipping containers and other transportation assets and enabling recording of the travels of the shipping container or transportation asset.

Accordingly, to achieve at least one of the objects above, an asset including an arrangement for self-monitoring comprises an interior sensor system arranged on the asset to obtain information about contents in the interior of the asset, a location determining system arranged on the asset to monitor the location of the asset and a communication system arranged on the asset and coupled to the interior sensor system and the location determining system. The communication system operatively transmits the information about the contents in the interior of the asset and the location of the asset to a remote facility.

The interior sensor system may comprise at least one wave transmitter arranged to transmit waves into the interior of the asset and at least one wave receiver arranged to receive waves from the interior of the asset. A processor is also typically provided to compare waves received by the wave receiver(s) at different times or analyze the waves received by the wave receiver(s), preferably compensating for thermal gradients in the interior of the asset in an appropriate manner. To conserve power, a door status sensor is arranged to detect when the door is closed after having been opened with the wave transmitter(s) being coupled to the door status sensor and transmitting waves into the interior of the asset only when the door status sensor detects when the door is closed after having been opened.

The interior sensor system can also comprise an RFID or SAW transmitter and receiver unit arranged to transmit signals into the interior of the asset and receive signals from RFID or SAW devices present in the interior of the asset. The interior sensor system can also comprise an optical barcode reader arranged to transmit light into the interior of the asset and receive light reflected from any barcodes present on objects in the interior of the asset.

The interior sensor system may be designed and constructed to determine the presence of objects and/or motion in the interior of the asset. It may also comprise at least one imager arranged to obtain images of the interior of the asset, in which case, a processor optionally embodying a pattern recognition system obtains information about the contents from the images obtained by the imager(s).

An inertial device may be coupled to the interior sensor system for detecting movement of the asset. The interior sensor system would receive information about movement of the asset and analyze the movement of the asset with the detected motion within the interior of the asset to ascertain whether the detected motion is caused by the movement of the asset or by independent movement of the contents in the interior of the asset.

Sensors included in the interior sensor system, may include at least one chemical sensor, a temperature sensor, a pressure sensor, a carbon dioxide sensor, a humidity sensor, a hydrocarbon sensor, a narcotics sensor, a mercury vapor sensor, a radioactivity sensor, a microphone and a light sensor. Another possible sensor is at least one weight sensor for measuring the weight of the contents of the asset or the distribution of weight in the interior of the asset. Still other possible sensors include inertial, acceleration, gyroscopic, ultrasonic, radar, electric field, magnetic, velocity, displacement among others. Any of the foregoing sensors can be provided with a diagnostic capability or self-diagnostic capability.

The interior sensor system may be designed to utilize a pattern recognition technique, neural network, modular neural network, combination neural network, fuzzy logic and the like that can be used to reduce the information about the contents in the interior of the asset to a minimum. Such techniques could also be used to reduce the information transmitted by the communication system to a minimum.

The interior sensor system can include an initiation device for periodically initiating the interior sensor system to obtain information about the contents in the interior of the asset. A wakeup sensor system can be provided for detecting the occurrence of an internal or external event requiring instantaneous or a change in the monitoring rate of the interior of the asset. The initiation device is coupled to the wakeup sensor system and arranged to change the rate at which it initiates the interior sensor system to obtain information about the contents in the interior of the asset in response to the detected occurrence of an internal or external event by the wakeup sensor system.

If the asset includes a motion or vibration detection system arranged to detect motion or vibration of the asset, the interior sensor system is optionally coupled thereto and arranged to detect information about the contents of the interior of the asset only after the asset is determined to have moved or vibrated from a stationary position.

If the asset includes a wakeup sensor system for detecting the occurrence of an internal or external event relating to the condition or location of the asset, the communication system is optionally coupled to the wakeup sensor system and arranged to transmit a signal relating to the detected occurrence of an internal or external event.

The asset can include a memory unit for storing data relating to the location of the asset and the contents in the interior of the asset. The memory unit can be arranged to store data relating to the opening and closing of the door, as determined by a door status sensor, in conjunction with the location of the asset and the contents in the interior of the asset.

If the asset includes a motion sensor arranged on the asset for monitoring motion of the asset, it can also include an alarm or warning system coupled to the motion sensor and activated when the motion sensor detects a potentially or actually dangerous motion of the asset.

The asset can also include one or more environment sensors arranged on the asset to measure a property of the environment in which the asset is situated, with such property being storable in a memory unit or transmittable in association with the location of the asset.

An exterior monitoring system for monitoring the area in the vicinity of the asset can also be provided. In this case, the exterior monitoring system can comprise an ultrasound sensor, imagers such as cameras both with and without illumination including visual, infrared or ultraviolet imagers, scanners, other types of sensors which sense other parts of the electromagnetic spectrum, capacitive sensors, electric or magnetic field sensors, laser radar, radar, phased array radar and chemical sensors, among others.

Another arrangement for monitoring an asset in accordance with the invention comprises a location determining system arranged on the asset to monitor the location of the asset, at least one environment sensor arranged on the asset to obtain information about the environment in which the asset is located and a communication system arranged on the asset and coupled to the environment sensor(s) and the location determining system. The communication system transmits the information about the location of the asset and the environment in which the asset is located to a remote facility. Other features of this arrangement include those mentioned above in the previous embodiment of the invention.

A method for monitoring movable assets and contents in the assets in accordance with the invention comprises the steps of assigning a unique identification code to each asset, determining the location of each asset, determining at least one property or characteristic of the contents of each asset, and transmitting the location of each asset along with the property(ies) or characteristic(s) of the contents of the asset to a data processing facility to form a database of information about the use of the assets or for retransmission to another location such as via the Internet. Determining a property or characteristic of the contents of each asset may entail determining the weight of the contents of the asset and/or determining the weight distribution of the contents of the asset, optionally utilizing the determined weight of the contents of the asset and/or the determined weight distribution of the contents of the asset and the known weight and weight distribution of the asset without contents.

At least one sensor may be arranged on each asset to determine a condition of the environment in the vicinity of the asset and the condition of the environment in the vicinity of the assets transmitted to the data processing for inclusion in the database or for retransmission. The sensor(s) can be constructed to measure or detect the exposure of the asset to excessive heat, exposure of the asset to excessive cold, vibrations of the asset, exposure of the asset to water and/or exposure of the asset to hazardous material.

At least one sensor may be arranged on each asset to determine a condition of the environment of the interior of the asset and the condition of the environment of the interior of the assets transmitted to the data processing facility for inclusion in the database or for retransmission. The sensor(s) can be constructed to measure or detect the presence of excessive heat in the interior of the asset, the presence of excessive cold in the interior of the asset, vibrations of the asset, the presence of water in the interior of the asset and/or the presence of hazardous material in the interior of the asset.

A responsive identification tag may be provided on individual cargo items at least when present in one of the assets and an initiation and reception device arranged in or on each asset to cause the identification tag on each cargo item in the asset to generate a responsive signal containing data on the cargo item when initiated by the initiation and reception device. Periodically, the initiation and reception device is initiated and the responsive signals from the cargo items received to thereby obtain information about the identification of the cargo items. The information about the identification of the cargo items is then transmitted to the data processing facility for inclusion in the database or for retransmission. The information about the identification of the cargo items received from each asset can be compared to pre-determined information about the identification of the cargo items in that asset. An alert may be generated upon the detection of differences between the information about the identification of the cargo items received from each asset and the pre-determined information about the identification of the cargo items in that asset.

A memory unit may be provided on each asset that may store information about the location of each asset along with the property or characteristic of the contents of the asset in the memory unit.

An optically readable identification code may be provided on individual cargo items at least when present in one of the assets and an initiation and reception device arranged in or on each asset to cause the identification code on each cargo items in the asset to provide a responsive pattern of light containing data on the cargo item when initiated by the initiation and reception device. Periodically, the initiation and reception device is initiated when the cargo items are in a position to direct light to the identification code on the cargo item. The responsive patterns of light are consequently received from the cargo items to thereby obtain information about the identification of the cargo items. The information about the identification of the cargo items may be transmitted to the data processing facility for inclusion in the database or otherwise processed and/or retransmitted. Optionally, the information about the identification of the cargo items received from each asset is compared to pre-determined information about the identification of the cargo items in that asset. An alert can thus be generated upon the detection of differences between the information about the identification of the cargo items received from each asset and the pre-determined information about the identification of the cargo items in that asset.

Openings and closings of each door of each asset can be detected such that the information about the openings and closings of each door is transmitted to the data processing for inclusion in the database or retransmitted.

To conserve power, closure of each door can be detected and the property or characteristic of the contents of each asset determined only after closure of the door is detected.

Information about an implement or individual moving the asset can be obtained and transmitted to the data processing facility for inclusion in the database or retransmission. This will keep tabs on the personnel or implements involved in the transfer, handling and movement of the asset.

Another method for monitoring movable assets and contents in the assets comprises mounting a portable, replaceable cell phone or PDA having a location providing function and a low duty cycle to the asset, enabling communications between the cell phone or PDA and the asset to enable the cell phone or PDA to obtain information about the asset and/or its contents (such as an identification number or other information obtained by various sensors associated with the asset) and establishing a communications channel between the cell phone or PDA and a location remote from the asset to enable the information about the asset and/or its contents to be transmitted to the remote location. The cell phone or PA may be coupled to a battery fixed to the asset to extend its operational life. When a cell phone is mounted to the asset, and includes a sound-receiving component, the cell phone can be provided with a pattern recognition system to recognize events relating to the asset based on sounds received by the sound-receiving component.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
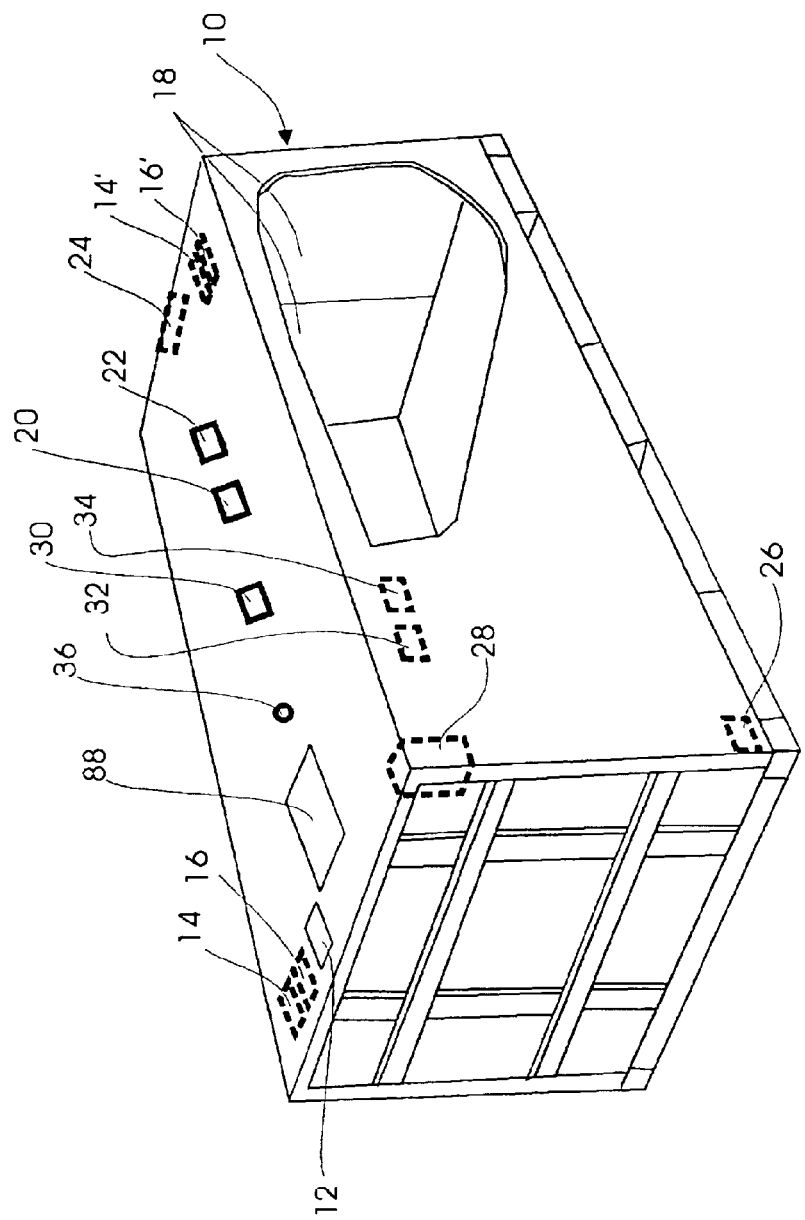
FIG. 1 is a perspective view showing a shipping container including one embodiment of the monitoring system in accordance with the present invention.

1. Monitoring the Interior Contents of a Shipping Container, Trailer, Boat, Shed, etc.

Commercial systems are now available from companies such as Skybitz Inc. 45365 Vintage Park Plaza, Suite 210, Dulles, Va. 20166-6700, which will monitor the location of an asset anywhere on the surface of the earth. Each monitored asset contains a low cost GPS receiver and a satellite communication system. The system can be installed onto a truck, trailer, container, or other asset and it well periodically communicate with a low earth orbit (LEO) or a geostationary satellite providing the satellite with its location as determined by the GPS receiver or a similar system such as the Skybitz Global Locating System (GLS). The entire system operates off of a lithium battery, for example, and if the system transmits information to the satellite once per day, the battery can last many years before requiring replacement. Thus, the system can monitor the location of a trailer, for example, once per day, which is sufficient if trailer is stationary. The interrogation rate can be automatically increased if the trailer begins moving. Such a system can last for 2 to 10 years without requiring maintenance depending on design, usage and the environment. Even longer periods are possible if power is periodically or occasionally available to recharge the battery such as by solar cells, capacitive coupling, inductive coupling, RF or vehicle power.

The Skybitz system by itself only provides information as to the location of a container and not information about its contents, environment, and/or other properties. This invention is intended to provide this additional information, which can be coded typically into a few bytes and sent to the satellite along with the container location information and identification. First consider monitoring of the interior contents of a container. From here on, the terms "shipping container" or "container" will be used as a generic cargo holder and will include all cargo holders including standard and non-standard containers, boats, sheds, warehouses, storage facilities, tanks, buildings or any other such object that has space and can hold cargo.

One method of monitoring the space inside such a container is to use ultrasound such as disclosed in U.S. Pat. Nos. 5,653,462, 5,829,782, 5,943,295, 5,901,978, 6,116,639, 6,186,537, 6,234,520, 6,254,127, 6,270,117, 6,283,503, 6,341,798, 6,397,136 and RE 37,260 for monitoring the interior of a vehicle (all of these patents are incorporated by reference herein in their entirety). Also, reference is made to U.S. Pat. No. 6,279,946, incorporated by reference herein, which discusses various ways to use an ultrasonic transducer while compensating for thermal gradients, all of which can be used in the invention to the extent possible. Reference is also made to U.S. Pat. Nos. 05,653,462, 05,694,320, 05,822, 707, 05,829,782, 05,835,613, 05,485,000, 05,488,802, 05,901,978, 05,943,295, 06,309,139, 06,078,854, 06,081, 757, 06,088,640, 06,116,639, 06,134,492, 06,141,432, 06,168,198, 06,186,537, 06,234,519, 06,234,520, 60,242, 701, 06,253,134, 06,254,127, 06,270,116, 06,279,946, 06,283,503, 06,324,453, 06,325,414, 06,330,501, 06,331, 014, RE37260 U.S. Pat. Nos. 06,393,133, 60,397,136, 06,412,813, 06,422,595, 06,452,870, 06,442,504, 06,445, 988, 06,442,465, all of which are incorporated herein and disclose inventions that may be incorporated into the invention(s) disclosed herein.

Consider now a standard shipping container that is used for shipping cargo by boat, trailer, or railroad. Such containers are nominally 8'w×8'h×20' or 40' long outside dimensions, however, a container 48' in length is also sometimes used. The inside dimensions are frequently around 4" less than the outside dimensions. In a simple interior container monitoring system, one or more ultrasonic transducers can be mounted on an interior part of the container adjacent the container's ceiling in a protective housing. Periodically, the ultrasonic transducers would emit a few cycles of ultrasound and receive reflected echoes of this ultrasound from walls and contents of the trailer. In some cases, especially for long containers, one or more transducers, typically at one end of the container, can send to one or more transducers located at, for example, the opposite end. Usually, however, the transmitters and receivers are located near each other.

Referring to FIG. 1, a container 10 is shown including an interior sensor system 12 arranged to obtain information about contents in the interior of the container 10. The interior sensor system includes a wave transmitter 14 mounted at one end of the container 10 and which operatively transmits waves into the interior of the container 10 and a wave receiver 16 mounted adjacent the wave transmitter 14 and which operatively receives waves from the interior of the container 10. As shown, the transmitter 14 and receiver 16 are adjacent one another but such a positioning is not intended to limit the invention. The transmitter 14 and receiver 16 can be formed as a single transducer or may be spaced apart from one another. Multiple pairs of transmitter/receivers can also be provided, for example transmitter 14' and receiver 16' are located at an opposite end of the container 10 proximate the doors 18.

The interior sensor system 12 includes a processor coupled to the receiver 16, and optionally the transmitter 14, and which is resident on the container 10, for example, in the housing of the receiver 16 or in the housing of a communication system 20. The processor is programmed to compare waves received by each receiver 16,16' at different times and analyze either the received waves individually or the received waves in comparison to or in relation to other received waves for the purpose of providing information about the contents in the interior of the container 10. The processor can employ pattern recognition techniques and as discussed more fully below, be designed to compensate for thermal gradients in the interior of the container 10. Information about the contents of the container 10 may be the presence or motion of objects in the interior. The processor may be associated with a memory unit which can store data on the location of the container 10 and the analysis of the data from the interior sensor system 12.

The container 10 also includes a location determining system 22 which monitors the location of the container 10. To this end, the location determining system can be any asset locator in the prior art, which typically include a GPS receiver, transmitter and appropriate electronic hardware and software to enable the position of the container 10 to be determined using GPS technology or other satellite or ground-based technology including those using the cell phone system or similar location based systems.

The communication system 20 is coupled to both the interior sensor system 12 and the location determining system 22 and transmits the information about the contents in the interior of the container 10 (obtained from the interior sensor system 12) and the location of the container 10 (obtained from the location determining system 22). This transmission may be to a remote facility wherein the information about the container 10 is stored, processed, counted, reviewed and/or monitored and/or retransmitted to another location, perhaps by way of the Internet.

The container 10 also includes a door status sensor 24 arranged to detect when one or both doors 18 is/are opened or closed after having been opened. The door status sensor 24 may be an ultrasonic sensor which is positioned a fixed distance from the doors 18 and registers changes in the position of the doors 18. Alternately, other door status systems can be used such as those based on switches, magnetic sensors or other technologies. The door status sensor 24 can be programmed to associate an increase in the distance between the sensor 24 and each of the doors 18 and a subsequent decrease in the distance between the sensor 24 and that door 18 as an opening and subsequent closing of that door 18. In the alternative, a latching device can be provided to detect latching of each door 18 upon its closure. The door status sensor 24 is coupled to the interior sensor system 12, or at least to the transmitters 14,14' so that the transmitters 14,14' can be designed to transmit waves into the interior of the container 10 only when the door status sensor 24 detects when at least one door 18 is closed after having been opened. For other purposes, the ultrasonic sensors may be activated on opening of the door(s) in order to monitor the movement of objects into or out of the container, which might in turn be used to activate an RFID or bar code reading system or other object identification system.

When the ultrasonic transducers are first installed into the container 10 and the doors 18 closed, an initial pulse transmission can be initiated and the received signal stored to provide a vector of data that is representative of an empty container. To initiate the pulse transmission, an initiation device or function is provided in the interior sensor system 12, e.g., the door status sensor 24. At a subsequent time when contents have been added to the container (as possibly reflected in the opening and closing of the doors 18 as detected by the door status sensor 24), the ultrasonic transducers can be commanded to again issue a few cycles of ultrasound and record the reflections. If the second pattern is subtracted from the first pattern, or otherwise compared, in the processor the existence of additional contents in the container 10 will cause the signal to change, which thus causes the differential signal to change and the added contents detected. Vector as used herein with ultrasonic systems is a linear array of data values obtained by rectifying, taking the envelope and digitizing the returned signal as received by the transducer.

When a container 10 is exposed to sunlight on its exterior top, a stable thermal gradient can occur inside the container 10 where the top of the container 10 near the ceiling is at a significantly higher temperature than the bottom of the container 10. This thermal gradient changes the density of the gas inside the container causing it to act as a lens to ultrasound that diffracts or bends the ultrasonic waves and can significantly affect the signals sensed by the receiver portions 16,16' of the transducers. Thus, the vector of sensed data when the container is at a single uniform temperature will look significantly different from the vector of sensed data acquired within the same container when thermal gradients are present.

It is even possible for currents of heated air to occur within a container 10 if a side of the container is exposed to sunlight. Since these thermal gradients can substantially affect the vector, the system must be examined under a large variety of different thermal environments. This generally requires that the electronics be designed to mask somewhat the effects of the thermal gradients on the magnitude of the sensed waves while maintaining the positions of these waves in time. This can be accomplished as described in detail in the above-referenced patents and patent applications through the use, for example, of a logarithmic compression circuit. There are other methods of minimizing the effect on the reflected wave magnitudes that will accomplish substantially the same result.

When the complicating aspects of thermal gradients are taken into account, in many cases a great deal of data must be taken with a large number of different occupancy situations to create a database of perhaps 10,000 to one million vectors each representing the different occupancy state of the container in a variety of thermal environments. This data can then be used to train a pattern recognition system such as a neural network, modular or combination neural network, cellular neural network, support vector machine, fuzzy logic system, Kalman filter system, sensor fusion system, data fusion system or other classification system. Since all containers of the type transported by ships, for example, are of standard sizes, only a few of these training exercises need to be conducted, typically one for each different geometry container. The process of adapting an ultrasonic occupancy monitoring system to a container or other space is described in considerable detail for automobile interior monitoring in the above-referenced patents and patent applications which are all incorporated herein by reference and therefore this process need not be repeated here.

Other kinds of interior monitoring systems can be used to determine and characterize the contents of a space such as a container. One example uses a scanner and photocell 26, as in a laser radar system, and can be mounted near the floor of the container 10 and operated to scan the space above the floor in a plane located, for example, 10 cm above the floor. Since the distance to a reflecting wall of the container 10 can be determined and recorded for each angular position of the scanner, the distance to any occupying item will show up as a reflection from an object closer to the scanner and therefore a shadow graph of the contents of the container 10 cm above the floor can be obtained and used to partially categorize the contents of the container 10. Categorization of the contents of the container 10 may involve the use of pattern recognition technologies. Naturally, other locations of such a scanning system are possible.

In both of these examples, relatively little can be said about the contents of the container other then that something is present or that the container is empty. Frequently this is all that is required. A more sophisticated system can make use of one or more imagers (for example cameras) 28 mounted near the ceiling of the container, for example. Such imagers can be provided with a strobe flash and then commanded to make an image of the trailer interior at appropriate times. The output from such an imager 28 can also be analyzed by a pattern recognition system such as a neural network or equivalent, to reduce the information to a few bytes that can be sent to a central location via an LEO or geostationary satellite, for example. As with the above ultrasonic example, one image can be subtracted from the empty container image and if anything remains then that is a representation of the contents that have been placed in the container. Also, various images can be subtracted to determine the changes in container contents when the doors are opened and material is added or removed or to determine changes in position of the contents. Various derivatives of this information can be extracted and sent by the telematics system to the appropriate location for monitoring or other purposes.

Each of the systems mentioned above can also be used to determine whether there is motion of objects within the container relative to the container. Motion of objects with the container 10 would be reflected as differences between the waves received by the transducers (indicative of differences in distances between the transducer and the objects in the container) or images (indicative of differences between the position of objects in the images). Such motion can also aid in image segmentation which in turn can aid in the object identification process. This is particularly valuable if the container is occupied by life forms such as humans.

In the system of FIG. 1, wires (not shown) are used to connect the various sensors and devices. It is contemplated that all of the units in the monitoring system can be coupled together wirelessly, using for example the Bluetooth, WI-FI or other protocol.

If an inertial device 30 is also incorporated, such as the MEMSIC dual axis accelerometer, which provides information as to the accelerations of the container 10, then this relative motion can be determined by the processor and it can be ascertained whether this relative motion is caused by acceleration of the container 10, which may indicate loose cargo, and/or whether the motion is caused by the sensed occupying item. In latter case, a conclusion can perhaps be reached that container is occupied by a life form such as an animal or human. Additionally, it may be desirable to place sensors on an item of cargo itself since damage to the cargo could occur from excessive acceleration, shock, temperature, vibration, etc. regardless of whether the same stimulus was experienced by the entire container. A loose item of cargo, for example, may be impacting the monitored item of cargo and damaging it. Relative motion can also be sensed in some cases from outside of the container through the use of accelerometers, microphones or MIR.

Chemical sensors 32 based on surface acoustic wave (SAW) or other technology can in many cases be designed to sense the presence of certain vapors in the atmosphere and can do so at very low power. A properly designed SAW or equivalent sensing device, for example, can measure temperature, pressure, carbon dioxide concentration, humidity, hydrocarbon concentration, and the presence or concentration of many other chemicals. A separate SAW or similar device may be needed for each chemical species (or in some cases each class of chemicals) where detection is desired. The devices, however, can be quite small and can be designed to use very little power. Such a system of SAW or equivalent devices can be used to measure the existence of certain chemical vapors in the atmosphere of the container much like a low power electronic nose. In some cases, it can be used to determine whether a carbon dioxide source such as a human is in the container. Such chemical sensing devices can also be designed, for example, to monitor for many other chemicals including some narcotics, hydrocarbons, mercury vapor, and other hazardous chemicals including some representative vapors of explosives or some weapons of mass destruction. With additional research, SAW or similar devices can also be designed or augmented to sense the presence of radioactive materials, and perhaps some biological materials such as smallpox or anthrax. In many cases, such SAW devices do not now exist, however, researchers believe that given the proper motivation that such devices can be created. Thus, although heretofore not appreciated, SAW or equivalent based systems can monitor a great many dangerous and hazardous materials that may be either legally or illegally occupying space within a container, for example. In particular, the existence of spills or leakages from the cargo can be detected in time to perhaps save damage to other cargo either within the container or in an adjacent container. Although SAW devices have in particular been described, other low power devices using battery or RF power can also be used where necessary.

Other sensors that can be designed to operate under very low power levels include microphones 34 and light sensors 36 or sensors sensitive to other frequencies in the electromagnetic spectrum as the need arises. The light sensors 36 could be designed to cause activation of the interior sensor system 12 when the container is being switched from a dark condition (normally closed) to a light situation (when the door or other aperture is opened). A flashlight could also activate the light sensor 36.

Instead of one or more batteries providing power to the interior sensor system 12, the communication system 20 and the location determining system 22, solar power can be used. In this case, one or more solar panels 88 are attached to the upper wall of the container 10 (see FIG. 1) and electrically coupled to the various power-requiring components of the monitoring system. A battery can thus be eliminated. In the alternative, since the solar panel(s) 88 will not always be exposed to sunlight, a rechargeable battery can be provided which is charged by the solar panel 88 when the solar panels are exposed to sunlight. A battery could also be provided in the event that the solar panel 88 does not receive sufficient light to power the components of the monitoring system. In a similar manner, power can temporarily be supplied by a vehicle such as a tractor either by a direct connection to the tractor power or though capacitive, inductive or RF coupling power transmission systems.

In some cases, a container is thought to be empty when in fact it is being surreptitiously used for purposes beyond the desires of the container owner or law enforcement authorities. The various transducers that can be used to monitor interior of a container as described above, plus others, can also be used to allow the trailer or container owner to periodically monitor the use of his property.

2. Monitoring the Entire Asset

Immediately above, monitoring of the interior of the container is described. If the container is idle, there may not the need to frequently monitor the status of the container interior or exterior until some event happens. Thus, all monitoring systems on the container can be placed in the sleep mode until some event such as a motion or vibration of the container takes place. Other wakeup events could include the opening of the doors or a change in the interior temperature of the container above a reference level, for example. When any of these chosen events occurs, the system can be instructed to change the monitoring rate and to immediately transmit a signal to a satellite or another communication system, or respond to a satellite-initiated signal for some LEO-based systems, for example. Such an event may signal to the container owner that a robbery was in progress either of the interior contents of the container or of the entire container. It also might signal that the contents of the container are in danger of being destroyed through temperature or excessive motion or that the container is being misappropriated for some unauthorized use.

Figure 2:
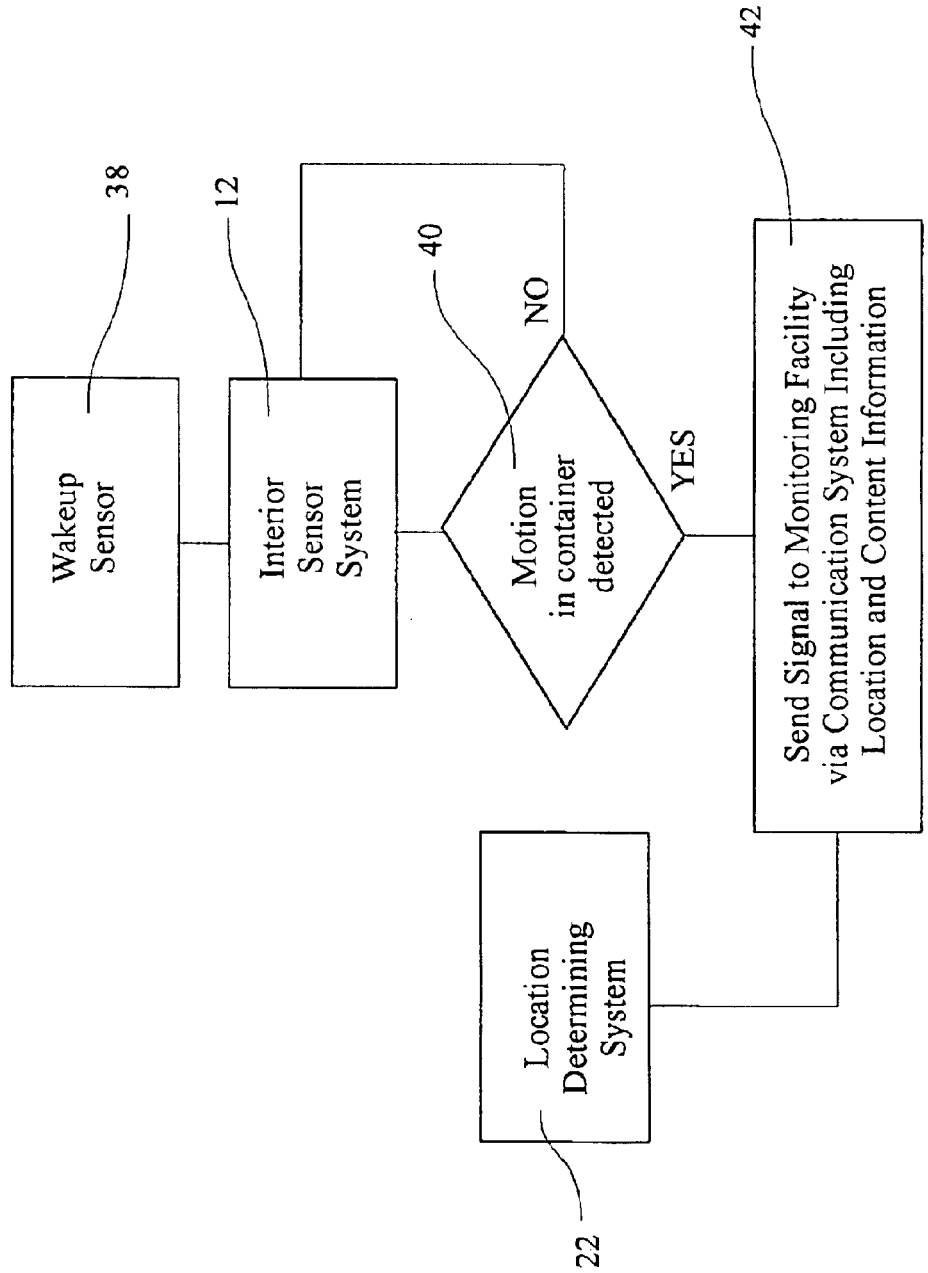
FIG. 2 is a flow chart showing one manner in which a container is monitored in accordance with the invention.

FIG. 2 shows a flowchart of the manner in which container 10 may be monitored by personnel or a computer program at a remote facility for the purpose of detecting unauthorized entry into the container and possible theft of the contents of the container 10. Initially, the wakeup sensor 38 detects motion, sound, light or vibration including motion of the doors 18, or any other change of the condition of the container 10 from a stationary or expected position. The wakeup sensor 38 can be designed to provide a signal indicative of motion only after a fixed time delay, i.e., a period of "sleep". In this manner, the wakeup sensor would not be activated repeatedly in traffic stop and go situations.

The wakeup sensor 38 initiates the interior sensor system 12 to perform the analysis of the contents in the interior of the container, e.g., send waves into the interior, receive waves and then process the received waves. If motion in the interior of the container is not detected at 40, then the interior sensor system 12 may be designed to continue to monitor the interior of the container, for example, by periodically re-sending waves into the interior of the container. If motion is detected at 40, then a signal is sent at 42 to a monitoring facility via the communication system 20 and which includes the location of the container 10 obtained from the location determining system 22 or by the ID for a permanently fixed container or other asset, structure or storage facility. In this manner, if the motion is determined to deviate from the expected handling of the container 10, appropriate law enforcement personnel can be summoned to investigate.

When it is known and expected that the container should be in motion, monitoring of this motion can still be important. An unexpected vibration could signal the start of a failure of the chassis tire, for example, or failure of the attachment to the chassis or the attachment of the chassis to the tractor. Similarly, an unexpected tilt angle of the container may signify a dangerous situation that could lead to a rollover accident and an unexpected shock could indicate an accident has occurred. Various sensors that can be used to monitor the motion of the container include gyroscopes, accelerometers and tilt sensors. An IMU (Inertial Measurement Unit) containing for example three accelerometers and three gyroscopes can be used.

In some cases, the container or the chassis can be provided with weight sensors that measure the total weight of the cargo as well as the distribution of weight. By monitoring changes in the weight distribution as the vehicle is traveling, an indication can result that the contents within the trailer are shifting which could cause damage to the cargo.

Other container and chassis monitoring can include the attachment of a trailer to a tractor, the attachment of electrical and/or communication connections, and the status of the doors to the container. If the doors are opened when this is not expected, this could be an indication of a criminal activity underway. Several types of security seals are available including reusable seals that indicate when the door is open or closed or if it was ever opened during transit, or single use seals that are destroyed during the process of opening the container.

Another application of monitoring the entire asset would be to incorporate a diagnostic module into the asset. Frequently, the asset may have operating parts, e.g., if it is a refrigerated and contains a refrigeration unit. To this end, sensors can be installed on the asset and monitored using pattern recognition techniques as disclosed in U.S. Pat. Nos. 5,809,437 and 6,175,787, incorporated by reference herein. As such, various sensors would be placed on the container 10 and used to determine problems with the container 10 which might cause it to operate abnormally, e.g., if the refrigeration unit were about to fail because of a refrigerant leak. In this case, the information about the expected failure of the refrigeration unit could be transmitted to a facility and maintenance of the refrigeration unit could be scheduled.

3. Telecommunications

Generally monitoring of containers, trailers, chassis etc. is accomplished through telecommunications primarily with LEO or geostationary satellites or through terrestrial-based communication systems. These systems are commercially available and will not be discussed here. Expected future systems include communication between the container and the infrastructure to indicate to the monitoring authorities that a container with a particular identification number is passing a particular terrestrial point. If this is expected, then no action would be taken. The container identification number can be part of a national database that contains information as to the contents of the container. Thus, for example, if a container containing hazardous materials approaches a bridge or tunnel that forbids such hazardous materials from passing over the bridge or through the tunnel, then an emergency situation can be signaled and preventative action taken.

It is expected that monitoring of the transportation of cargo containers will dramatically increase as the efforts to reduce terrorist activities also increase. If every container that passes within the boarders of the United States has an identification number and that number is in a database that provides the contents of that container, then the use of shipping containers by terrorists or criminals should gradually be eliminated. If these containers are carefully monitored by satellite or another communication system that indicates any unusual activity of a container, an immediate investigation can result and then the cargo transportation system will gradually approach perfection where terrorists or criminals are denied this means of transporting material into and within the United States. If any container is found containing contraband material, then the entire history of how that container entered the United States can be checked to determine the source of the failure. If the failure is found to have occurred at loading port outside of the United States, then sanctions can be imposed on the host country that could have serious effects on that country's ability to trade worldwide. Just the threat of such an action would be a significant deterrent. Thus, the use of containers to transport hazardous materials or weapons of mass destruction as well as people, narcotics, or other contraband and can be effectively eliminated through the use of the container monitoring system of this invention.

Prior to the entry of a container ship into a harbor, a coast guard boat from the U.S. Customs Service can approach the container vessel and scan all of the containers thereon to be sure that all such containers are registered and tracked including their contents. Where containers contain dangerous material legally, the seals on those containers can be carefully investigated prior to the ship entering U.S. waters. Obviously, many other security precautions can now be conceived once the ability to track all containers and their contents has been achieved according to the teachings of this invention.

Containers that enter the United States through land ports of entry can also be interrogated in a similar fashion. As long as the shipper is known and reputable and the container contents are in the database, which would probably be accessible over the Internet, is properly updated, then all containers will be effectively monitored that enter the United States with the penalty of an error resulting in the disenfranchisement of the shipper, and perhaps sanctions against the country, which for most reputable shippers or shipping companies would be a severe penalty sufficient to cause such shippers or shipping companies to take appropriate action to assure the integrity of the shipping containers. Naturally, intelligent selected random inspections guided by the container history would still take place.

Although satellite communication is preferred, communication using cell phones and infrastructure devices placed at appropriate locations along roadways are also possible. Eventually there will be a network linking all vehicles on the highways in a peer-to-peer arrangement (perhaps using Bluetooth, IEEE 802.11 (WI-FI) or other local or ad-hoc network) at which time information relative to container contents etc. can be communicated to the Internet or elsewhere through this peer-to-peer network. It is expected that a pseudo-noise-based or similar communication system such as a code division multiple access (CDMA) system, wherein the identifying code of a vehicle is derived from the vehicle's GPS determined location, will be the technology of choice for this peer-to-peer vehicle network. It is expected that this network will be able to communicate such information to the Internet (with proper security precautions including encryption where necessary or desired) and that all of the important information relative to the contents of moving containers throughout the United States will be available on the Internet on a need-to-know basis. Thus, law enforcement agencies can maintain computer programs that will monitor the contents of containers using information available from the Internet. Similarly, shippers and receivers can monitor the status of their shipments through a connection onto the Internet. Thus, the existence of the Internet or equivalent can be important to the monitoring system described herein.

An alternate method of implementing the invention is to make use of a cell phone or PDA. Cell phones that are now sold contain a GPS-based location system as do many PDAs. Such a system along with minimal additional apparatus can be used to practice the teachings disclosed herein. In this case, the cell phone, PDA or similar portable device could be mounted through a snap-in attachment system, for example, wherein the portable device is firmly attached to the vehicle. The device can at that point, for example, obtain an ID number from the container through a variety of methods such as a RFID, SAW or hardwired based system. It can also connect to a satellite antenna that would permit the device to communicate to a LEO or GEO satellite system as described above. Since the portable device would only operate on a low duty cycle the battery should last for many days or perhaps longer. Of course, if it is connected to the vehicle power system, its life could be indefinite. Naturally, when power is waning, this fact can be sent to the satellite or cell phone system to alert the appropriate personnel. Since a cell phone contains a microphone, it could be trained, using an appropriate pattern recognition system, to recognize the sound of an accident or the deployment of an airbag or similar event. It thus becomes a very low cost OnStar® type telematics system.

As an alternative to using a satellite network, the cell phone network can be used in essentially the same manner when a cell phone signal is available. Naturally, all of the sensors disclosed herein can either be incorporated into the portable device or placed on the vehicle and connected to the portable device when the device is attached to the vehicle. This system has a key advantage of avoiding obsolescence. With technology rapidly changing, the portable device can be exchanged for a later model or upgraded as needed or desired keeping the overall system at the highest technical state. Existing telematics systems such as OnStar® can of course also be used with this system.

Importantly, an automatic emergency notification system can now be made available to all owners of appropriately configured cell phones, PDAs, or other similar portable devices that can operate on a very low cost basis without the need for a monthly subscription since they can be designed to operate only on an exception basis. Owners would pay only as they use the service. Stolen vehicle location, automatic notification in the event of a crash even with the transmission of a picture for camera-equipped devices is now possible. Automatic door unlocking can also be done by the device since it could transmit a signal to the vehicle, in a similar fashion as a keyless entry system, from either inside or outside the vehicle. The phone can be equipped with a biometric identification system such as fingerprint, voice print, facial or iris recognition etc. thereby giving that capability to vehicles. The device can thus become the general key to the vehicle or house, and can even open the garage door etc. If the cell phone is lost, its whereabouts can be instantly found since it has a GPS receiver and knows where it is. If it is stolen, it will become inoperable without the biometric identification from the owner.

Other communication systems will also frequently be used to connect the container with the chassis and/or the tractor and perhaps the identification of the driver or operator. Thus, information can be available on the Internet showing what tractor, what trailer, what container and what driver is operating at a particular time, at a particular GPS location, on a particular roadway, with what particular container contents. Suitable security will be provided to ensure that this information is not freely available to the general public. Naturally, redundancy can be provided to prevent the destruction or any failure of a particular site from failing the system.

This communication between the various elements of the shipping system which are co-located (truck, trailer, container, container contents, driver etc.) can be connected through a wired or wireless bus such as the CAN bus. Also, an electrical system such as disclosed in U.S. Pat. Nos. 5,809,437, 6,175,787 and 6,326,704, all of which are incorporated by reference herein, can also be used in the invention.

4. Recording

In many cases it is desirable to obtain and record additional information about the cargo container and its contents. As mentioned above, the weight of the container with its contents and the distribution and changes in this weight distribution could be valuable for a safety authority investigating an accident, for highway authorities monitoring gross vehicle weight, for container owners who charge by the used capacity, and others. The environment that the container and its contents have been subjected to could also be significant information. Such things as whether the container was flooded, exposed to a spill or leakage of a hazardous material, exposed to excessive heat or cold, shocks, vibration etc. can be important historical factors for the container affecting its useful life, establishing liability for damages etc. For example, a continuous monitoring of container interior temperature could be significant for perishable cargo and for establishing liability.

Figure 3A:
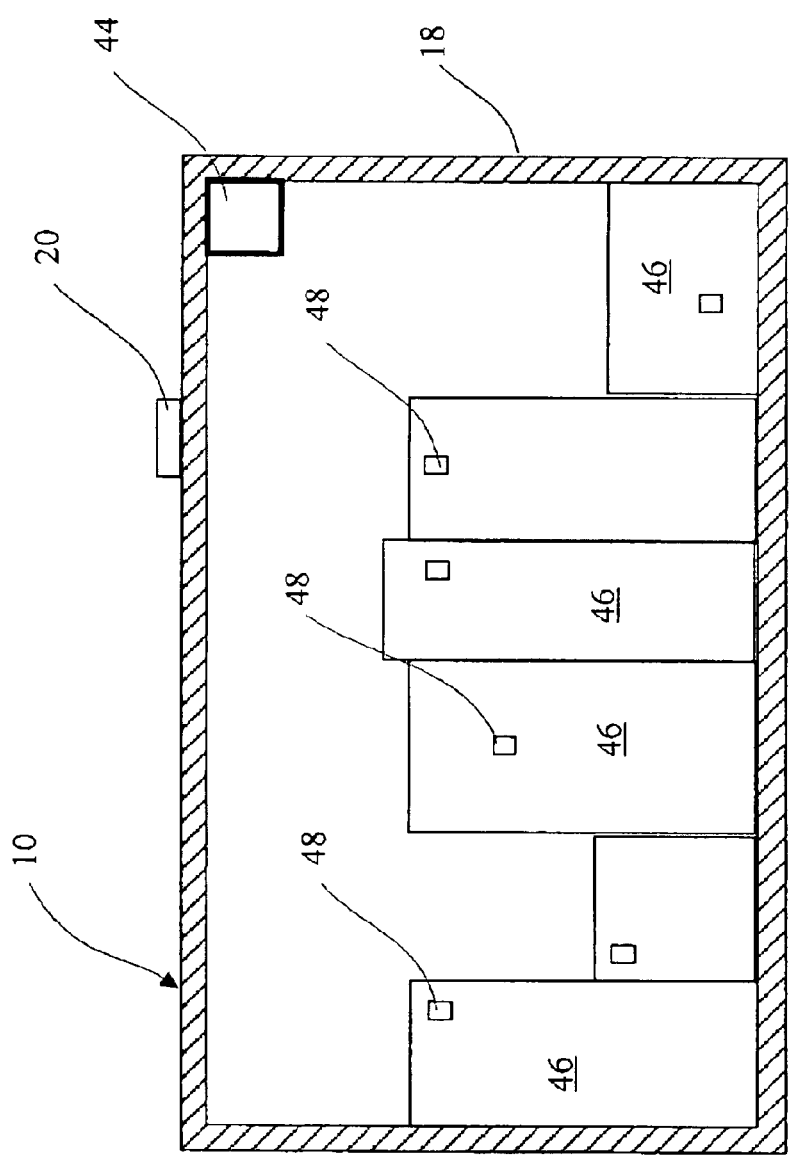
FIG. 3A is a cross-sectional view of a container showing the use of RFID technology in a monitoring system and method in accordance with the invention.

With reference to FIG. 3A, in some cases, the individual cargo items 46 can be tagged with RFID or SAW tags 48 and the presence of this cargo in the container 10 could be valuable information to the owner of the cargo. One or more sensors on the container that periodically read RFID tags could be required, such as one or more RFID interrogators 44 which periodically sends a signal which will causes the RFID tags 48 to generate a responsive signal. The responsive signal generated by the RFID tags 48 will contain information about the cargo item on which the RFID tag 48 is placed. Multiple interrogators or at least multiple antennas may be required depending on the size of the container.

Figure 3B:
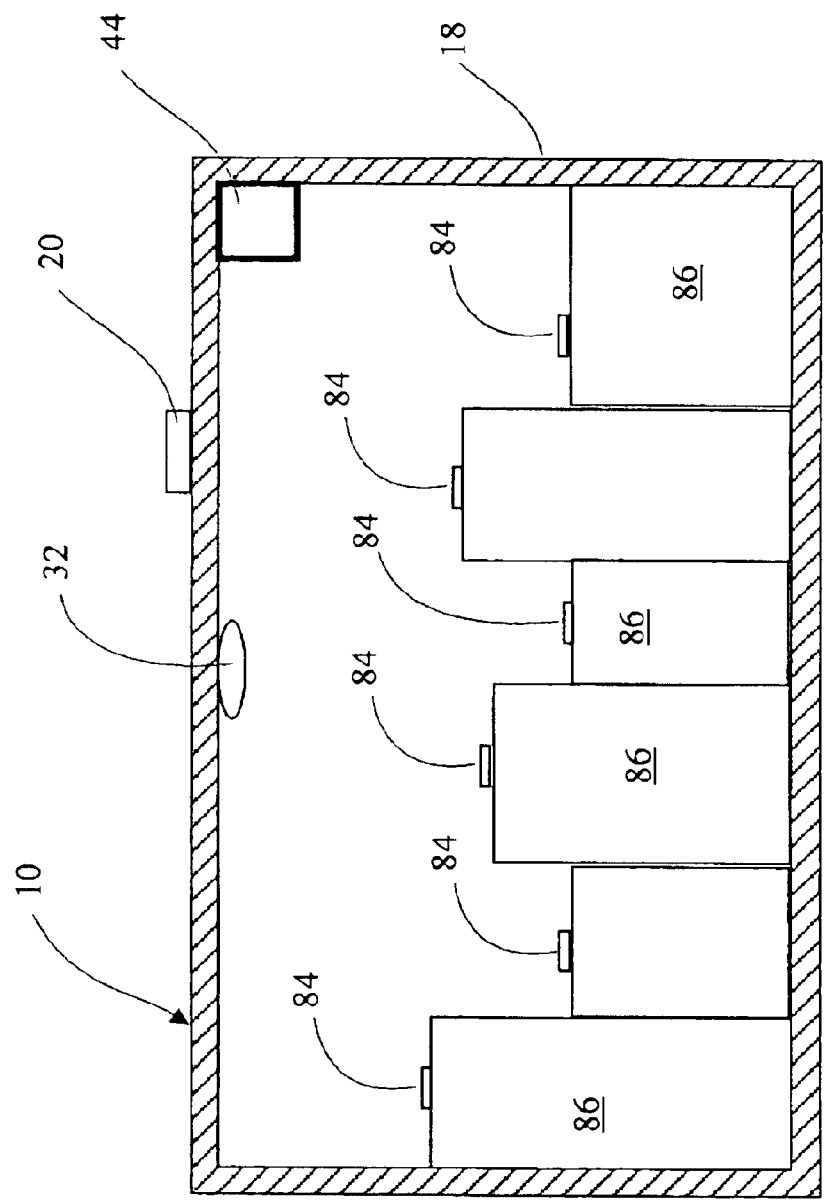
FIG. 3B is a cross-sectional view of a container showing the use of barcode technology in a monitoring system and method in accordance with the invention.

Similarly, for certain types of cargo, a barcode system might acceptable, or another optically readable identification code. The cargo items would have to be placed so that the identification codes are readable, i.e., when a beam of light is directed over the identification codes, a pattern of light is generated which contains information about the cargo item. As shown in FIG. 3B, the cargo items in this case are boxes having an equal height so that a space remains between the top of the boxes 86 and the ceiling of the container 10. One or more optical scanners 82, including a light transmitter and receiver, are arranged on the ceiling of the container and can be arranged to scan the upper surfaces of the boxes 86, possibly by moving the length of the container 10, or through a plurality of such sensors. During such a scan, patterns of light are reflected from the barcodes 84 on the upper surfaces of the boxes 86 and received by the optical scanner 82. The patterns of light contain information about the cargo items in the boxes 86. Receivers can be arranged at multiple locations along the ceiling. Other arrangements to ensure that a light beam traverses a barcode 84 and is received by a receiver can also be applied in accordance with the invention.

The ability to read barcodes and RFID tags provides the capability of the more closely tracking of packages for such organizations as UPS, Federal Express, the U.S. Postal Service and their customers. Now, in some cases, the company can ascertain that a given package is in fact on a particular truck or cargo transporter and also know the exact location of the transporter.

Frequently, a trailer or container has certain hardware such as racks for automotive parts, for example, that are required to stay with the container. During unloading of the cargo these racks, or other sub-containers, could be removed from the container and not returned. If the container system knows to check for the existence of these racks, then this error can be eliminated. Frequently, the racks are of greater value then the cargo they transport. Using RFID tags and a simple interrogator mounted on the ceiling of the container perhaps near the entrance, enables monitoring of parts that are taken in or are removed from the container and associated with the location of container. By this method, pilferage of valuable or dangerous cargo can at least be tracked.

Containers constructed in accordance with the invention will frequently have a direct method of transmitting information to a satellite. Typically, the contents of the container are more valuable than the truck or chassis for the case of when the container is not a trailer. If the tractor, train, plane or ship that is transporting the container is experiencing difficulties, then this information can be transmitted to the satellite system and thus to the container, carrier, or cargo owner or agent for attention. Information indicating a problem with carrier (railroad, tractor, plane, boat) may be sensed and reported onto a bus such as CAN bus which can be attached either wirelessly or by wires to the container. Alternately, sensors on the container can determine through vibrations etc. that the carrier may be experiencing problems. The reporting of problems with the vehicle can come from dedicated sensors or from a general diagnostic system such as described in U.S. Pat. Nos. 5,809,437 and 6,175,787. Whatever the source of the diagnostic information, especially when valuable or dangerous cargo is involved, this information in coded form can be transmitted to a ground station, LEO or geostationary satellite as discussed above. Other information that can be recorded by container includes the identification of the boat, railroad car, or tractor and operator or driver.

The experiences of the container can be recorded over time as a container history record to help in life cycle analysis to determine when a container needs refurbishing, for example. This history in coded form could reside on a memory that is resident on the container or preferably the information can be stored on a computer file associated with that container in a database. The mere knowledge of where a container has been, for example, may aid law enforcement authorities to determine which containers are most likely to contain illegal contraband.

The pertinent information relative to a container can be stored on a tag that is associated and physically connected to the container. This tag may be of the type that can be interrogated remotely to retrieve its contents. Such a tag, for example, could contain information as to when and where the container was most recently opened and the contents of the container. Thus, as containers enter a port, their tags can each be interrogated to determine their expected contents and also to give a warning for those containers that should be inspected more thoroughly. In most cases, the tag will not reside on the container but in fact will be on a computer file accessible by those who have an authorization to interrogate the file. Thus, the container need only have a unique identification number that cannot easily be destroyed, changed or otherwise tampered with. These can be visual and painted on the outside of the container or an RFID, barcode or other object identification system can be used.

Figure 4:
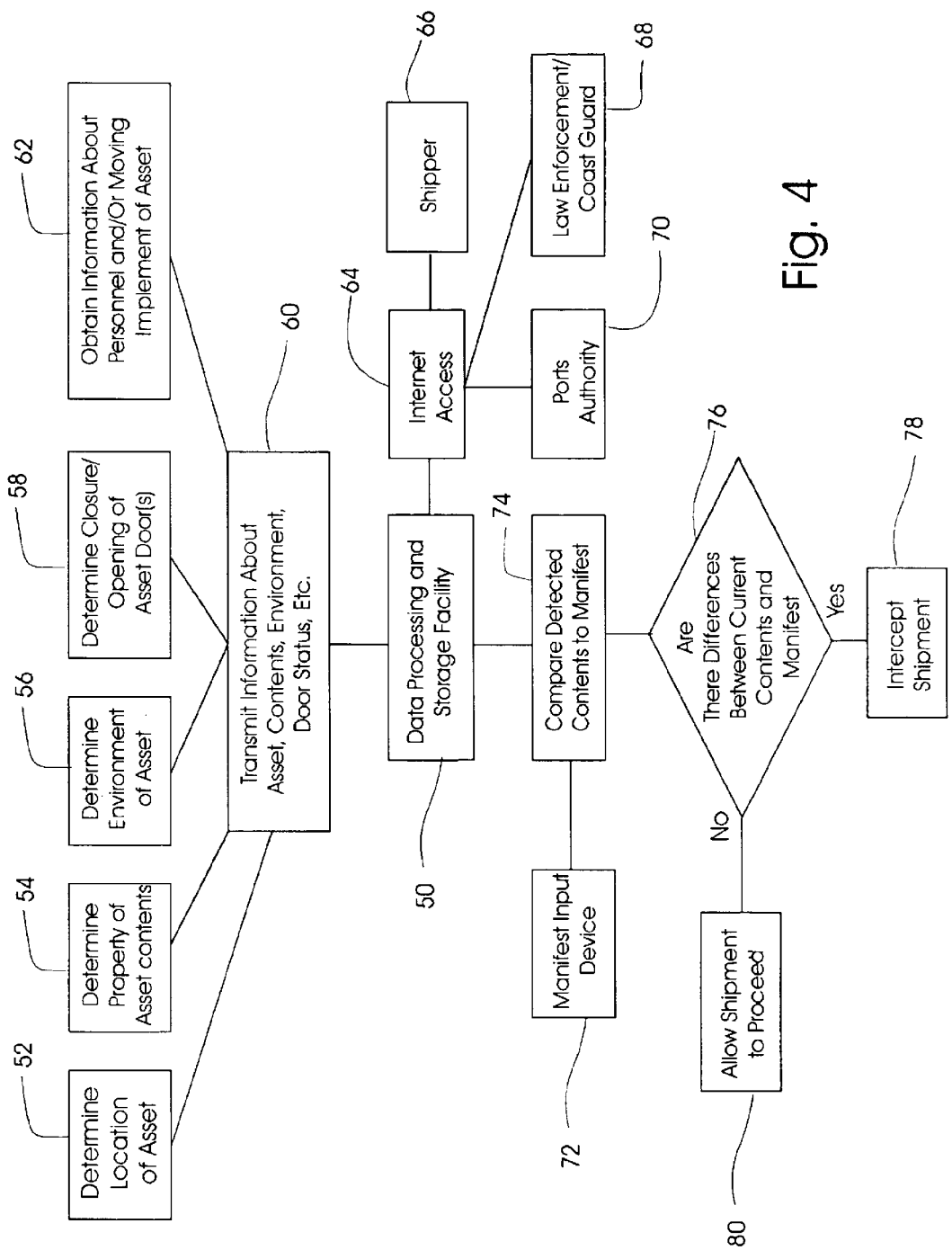
FIG. 4 is a flow chart showing one manner in which multiple assets are monitored in accordance with the invention.

FIG. 4 shows a flow chart of the manner in which multiple assets may be monitored using a data processing and storage facility 50, each asset having a unique identification code. The location of each asset is determined at 52, along with one or more properties or characteristics of the contents of each asset at 54, one or more properties of the environment of each asset at 56, and/or the opening and/or closing of the doors of each asset at 58. This information is transmitted to the data processing and storage facility 50 as represented by 60 with the identification code. Information about the implement being used to transport the asset and the individual(s) or company or companies involved in the transport of the asset can also be transmitted to the facility as represented by 62. This latter information could be entered by an input device attached to the asset.

The data processing and storage facility 50 is connected to the Internet at 64 to enable shippers 66 to check the progress of the asset, the contents of the asset, the environment of the asset, whether the doors are being opened and closed impermissibly and the individual and companies handling the asset. The same information, or a subset of this information, can also be accessed by law enforcement personnel at 68 and maritime/port authorities at 70. Different entities can be authorized to access different items of information or subsets of the total information available relating to each asset.

For anti-theft purposes, the shipper enters the manifest of the asset using an input device 72 so that the manifest can be compared to the contents of the asset (at 74). A determination is made at 76 as to whether there are any differences between the current contents of the asset and the manifest. For example, the manifest might indicate the presence of contents whereas the information transmitted by the asset reveals that it does not contain any objects. When such a discrepancy is revealed, the shipment can be intercepted at 78 to ascertain the whereabouts of the cargo. The history of the travels of the asset would also be present in the data facility 50 so that it can be readily ascertained where the cargo disappeared. If no discrepancy is revealed, the asset is allowed to proceed at 80.

5. Exterior Monitoring

Having the ability to transmit coded information to a satellite, or other telematics system, using a low cost device having a battery that lasts for many years opens up many other, previously impractical opportunities. Many of these opportunities are discussed above and below and all are teachings of this invention. In this section, opportunities related to monitoring the environment in the vicinity of the container will be discussed. Many types of sensors can be used for the purpose of exterior monitoring including ultrasound, imagers such as cameras both with and without illumination including visual, infrared or ultraviolet imagers, radar, scanners including laser radar and phased array radar, other types of sensors which sense other parts of the electromagnetic spectrum, capacitive sensors, electric or magnetic field sensors, and chemical sensors among others.

Cameras either with or without a source of illumination can be used to record people approaching the container and perhaps stealing the contents of the container. At the appropriate frequencies, (tetra Hertz, for example) the presence of concealed weapons can be ascertained as described in *Alien Vision: Exploring the Electromagnetic Spectrum With Imaging Technology* (SPIE Monograph Vol. PM104) by Austin Richards, which is incorporated herein by reference. Infrared sensors can be used to detect the presence of animal life including humans in the vicinity of container. Radio frequency sensors can sense the presence of authorized personnel having a keyless entry type transmitter or a SAW, RFID or similar device of the proper design. In this way, the container can be locked as a safe, for example, and only permit an authorized person carrying the proper identification to open the container or other storage facility.

A pattern recognition system can be trained to identify facial or iris patterns, for example, of authorized personnel or ascertain the identity of authorized personnel to prevent theft of the container. Such a pattern recognition system could operate on the images obtained by the cameras. That is, if the pattern recognition system is a neural network, it would be trained to identify or ascertain the identity of authorized personnel based on images of such personnel during a training phase and thus operationally only allow such personnel to open the container, enter the container and/or handle the container.

Naturally a wide variety of smart cards, biometric identification systems (such as fingerprints, voice prints and Iris scans), can be used for the same purpose. When an unauthorized person approaches the container, his or her picture can be taken and in particular, if sensors determine that someone is attempting to force entry into the container, that person's picture can be relayed via the communication system to the proper authorities. Cameras with a proper pattern recognition system can also be used to identify if an approaching person is wearing a disguise such as a ski mask or is otherwise acting in a suspicious manner. This determination can provide a critical timely warning and in some cases permit an alarm to be sounded or otherwise notify the proper authorities.

Capacitance sensors or magnetic sensors can be used to ascertain that the container is properly attached to a trailer. An RFID or barcode scanner on the container can be used to record the identification of the tractor, trailer, or other element of the transportation system. These are just a small sampling of the additional sensors that can be used with the container or even mounted on a tractor or chassis to monitor the container. With the teachings of this invention, the output of any of these sensors can now be transmitted to a remote facility using a variety of telematics methods including communication via a low power link to a satellite, such as provided by the Skybitz Corporation as described above and others.

Thus, as mentioned above, many new opportunities now exist for applying a wide variety of sensors to a cargo container or other object as discussed above and below. Through a communication system such as a LEO or geostationary or other satellite system, critical information about the environment of container or changes in that environment can be transmitted to the container owner, law enforcement authorities, container contents owner etc. Furthermore, the system is generally low cost and does not require connection to an external source of power. The system generally uses low power from a battery that can last for years without maintenance, 6. Analysis Many of the sensor systems described above output data that can best be analyzed using pattern recognition systems such as neural networks, cellular neural networks, fuzzy logic, sensor fusion, modular neural networks, combination neural networks, support vector machines, neural fuzzy systems or other classifiers that convert the pattern data into an output indicative of the class of the object or event being sensed. One interesting method, for example, is the ZISC® chip system of Silicon Recognition Inc., Petaluna, Calif. A general requirement for the low power satellite monitoring system is that the amount of data routinely sent to the satellite be kept to a minimum. For most transmissions, this information will involve the location of the container, for example, plus a few additional bytes of status information determined by the mission of the particular container and its contents. Thus, the pattern recognition algorithms must convert typically a complex image or other data to a few bytes representative of the class of the monitored item or event.

In some instances, the container must send considerably more data and at a more frequent interval than normal. This will generally happen only during an exceptional situation or event and when the added battery drain of this activity is justified. In this case, the system will signal the satellite that an exception situation exists and to prepare to receive additional information.

Many of the sensors on the container and inside the container may also require significant energy and thus should be used sparingly. For example, if the container is known to be empty and the doors closed, there is no need to monitor the interior of the container unless the doors have been reopened. Similarly, if the container is stationary and doors are closed, then continuously monitoring the interior of the container to determine the presence of cargo is unnecessary. Thus, each of the sensors can have a program duty cycle that depends on exterior or other events. Naturally, in some applications either solar power or other source of power may be available either intermittently to charge the battery or continuously.

Since the duty cycle of the sensor system may vary considerably, and since any of the sensors can fail, be sabotaged or otherwise be rendered incapable of performing its intended function either from time, exposure, or intentionally, it is expected that some or all of the sensors will be equipped with a diagnostic capability. The communication system will generally interrogate each sensor or merely expect a transmission from each sensor and if that interrogation or transmission fails or a diagnostic error occurs, this fact will be communicated to the appropriate facility. If, for example, someone attempts to cover the lens of a camera so that a theft would not be detected, the mere fact that the lens was covered could be reported, alerting authorities that something unusual was occurring.

7. Safety

As mentioned previously, there are times when the value of the contents of a container can exceed the value of the tractor, chassis and container itself Additionally, there are times when the contents of the container can be easily damaged if subjected to unreasonable vibrations, angles, accelerations and shocks. For these situations, an inertial measurement unit (IMU) can be used in conjunction with the container to monitor the accelerations experienced by the container (or the cargo) and to issue a warning if those accelerations are deemed excessive either in magnitude, duration, or frequency or where the integrations of these accelerations indicate an excessive velocity, angular velocity or angular displacement.

If the vehicle operates on a road that has previously been accurately mapped, to an accuracy of perhaps a few centimeters, then the analysis system can know the input from the road to the vehicle tires and thus to the chassis of the trailer. The IMU can also calculate the velocity of the trailer. By monitoring the motion of the container when subjected to a known stimulus, the road, the inertial properties of the container and chassis system can be estimated. If these inertial properties are known than a safe operating speed limit can be determined such that the probability of rollover, for example, is kept within reasonable bounds. If the driver exceeds that velocity, then a warning can be issued. Similarly, in some cases, the traction of the trailer wheels on the roadway can be estimated based on the tendency of a trailer to skid sideways. This also can be the basis of issuing a warning to the driver and to notify the contents owner especially if the vehicle is being operated in an unsafe manner for the road or weather conditions. Since the information system can also know the weather conditions in the area where the vehicle is operating, this added information can aid in the safe driving and safe speed limit determination. In some cases, the vibrations caused by a failing tire can also be determined. For those cases where radio frequency tire monitors are present, the container can also monitor the tire pressure and determine when a dangerous situation exists. Finally, the vehicle system can input to the overall system when the road is covered with ice or when it encounters a pothole.

Thus, there are many safety related aspects to having sensors mounted on a container and where those sensors can communicate periodically with a LEO or other satellite, or other communication system, and thereafter to the Internet or directly to the appropriate facility. Some of these rely on an accurate IMU. Although low cost IMUs are generally not very accurate, when they are combined using a Kalman filter with the GPS system, which is on the container as part of the tracking system, the accuracy of the IMU can be greatly improved, approaching that of military grade systems.

8. Other Remote Monitoring

The discussion above has concentrated on containers that contain cargo where presumably this cargo is shipped from one company or organization to another. This cargo could be automotive parts, animals, furniture, weapons, bulk commodities, machinery, fruits, vegetables, TV sets, or any other commonly shipped product. What has been described above is a monitoring system for tracking this cargo and making measurements to inform the interested parties (owners, law enforcement personnel etc.) of the status of the container, its contents, and the environment. This becomes practical when a satellite system exists such as the Skybitz, for example, LEO or geostationary satellite system coupled with a low cost low power small GPS receiver and communication device capable of sending information periodically to the satellite. Once the satellite has received the position information from the container, for example, this information can be relayed to a computer system wherein the exact location of the container can be ascertained. Additionally, if the container has an RFID reader, the location of all packages having an RFID tag that are located within the container can also be ascertained.

The accuracy of this determination is currently now approximately 20 meters. However, as now disclosed for the first time, the ionosphere caused errors in GPS signals received by container receiver can be determined from a variety of differential GPS systems and that information can be coupled with the information from the container to determine a precise location of the container to perhaps as accurate as a few centimeters. This calculation can be done at any facility that has access to the relevant DGPS corrections and the container location. It need not be done onboard the container. Using accurate digital maps the location of the container on the earth can be extremely precisely determined. This principle can now be used for other location determining purposes. The data processing facility that receives the information from the asset via satellites, can also know the DGPS corrections at the asset location and thus can relay to the vehicle its precise location.

Although the discussion above has centered on cargo transportation as an illustrative example, this invention is not limited thereto and in fact can be used with any asset whether movable or fixed where monitoring for any of a variety of reasons is desired. These reasons include environmental monitoring, for example, where asset damage can occur if the temperature, humidity, or other atmospheric phenomena exceeds a certain level. Such a device then could transmit to the telecommunications system when this exception situation occurred. It still could transmit to the system periodically, perhaps once a day, just to indicate that all is OK and that an exceptional situation did not occur.

Another example could be the monitoring of a summer home during the months when the home is not occupied. Of course, any home could be so monitored even when the occupants leave the home unattended for a party, for example. The monitoring system could determine whether the house is on fire, being burglarized, or whether temperature is dropping to the point that pipes could freeze due to a furnace or power failure. Such a system could be less expensive to install and maintain by a homeowner, for example, than systems supplied by ADT, for example.

Naturally, the monitoring of a real estate location could also be applied to industrial, governmental and any other similar sites. Any of the sensors including electromagnetic, cameras, ultrasound, capacitive, chemical, moisture, temperature, pressure, radiation, etc. could be attached to such a system which would not require any other electrical connection either to a power source or to a communication source such as a telephone line which is currently require by ADT, for example. In fact, most currently installed security and fire systems require both a phone and a power connection. Naturally, if a power source is available it can be used to recharge the batteries or as primary power.

Of particular importance, this system and techniques can be applied to general aviation and the marine community for the monitoring of flight and boat routings. For general aviation, this or a similar system can be used for monitoring the unauthorized approach of planes or boats to public utilities, government buildings, bridges or any other structure and thereby warn of possible terrorist activities.

Portable versions of this system can also be used to monitor living objects such as pets, children, animals, cars, and trucks, or any other asset. What is disclosed herein therefore is a truly general asset monitoring system where the type of monitoring is only limited by requirement that the sensors operate under low power and the device does not require connections to a power source, other than the internal battery, or a wired source of communication. The communication link is generally expected to be via a transmitter and a LEO, geostationary or other satellite, however, it need not be the case and communication can be by cell phone, an ad hoc peer-to-peer network, IEEE 801.11, Bluetooth, or any other wireless system. Thus, using the teachings of this invention, any asset can be monitored by any of a large variety of sensors and the information communicated wireless to another location which can be a central station, a peer-to-peer network, a link to the owners location, or, preferably, to the Internet.

Additional areas where the principles of the invention can be used for monitoring other objects include the monitoring of electric fields around wires to know when the wires have failed or been cut, the monitoring of vibrations in train rails to know that a train is coming and to enable tracking of the path of trains, the monitoring of vibrations in a road to know that a vehicle is passing, the monitoring of temperature and/or humidity of a road to signal freezing conditions so that a warning could be posted to passing motorists about the conditions of the road, the monitoring of vibrations or flow in a oil pipe to know if the flow of oil has stopped or being diverted so that a determination may be made if the oil is being stolen, the monitoring of infrared or low power (MIR) radar signal monitoring for perimeter security, the monitoring of animals and/or traffic to warn animals that a vehicle is approaching to eliminate car to animal accidents and the monitoring of fluid levels in tanks or reservoirs. It is also possible to monitor grain levels in storage bins, pressure in tanks, chemicals in water or air that could signal a terrorist attack, a pollution spill or the like, carbon monoxide in a garage or tunnel, temperature or vibration of remote equipment as a diagnostic of pending system failure, smoke and fire detectors and radiation. In each case, one or more sensors is provided designed to perform the appropriate, desired sensing, measuring or detecting function and a communications unit is coupled to the sensor(s) to enable transmission of the information obtained by the sensor(s). A processor can be provided to control the sensing function, i.e., to enable only periodic sensing or sensing conditioned on external or internal events. For each of these and many other applications, a signal can be sent to a satellite or other telematics system to send important information to a need-to-know person, monitoring computer program, the Internet etc.

Three other applications of this invention need particular mention. Periodically, a boat or barge impacts with the structure of a bridge resulting in the collapse of a road, railroad or highway and usually multiple fatalities. Usually such an event can be sensed prior to the collapse of the structure by monitoring the accelerations, vibrations, displacement, or stresses in the structural members. When such an event is sensed, a message can be sent to a satellite and/or forwarded to the Internet, and thus to the authorities and to a warning sign or signal that has been placed at a location preceding entry onto the bridge. Alternately, the sensing device can send a signal directly to the relevant sign either in addition or instead of to a satellite.

Sometimes the movement of a potentially hazardous cargo in itself is not significantly unless multiple such movements follow a pattern. For example, the shipment of moderate amounts of explosives forwarded to a single location could signify an attack by terrorists. By comparing the motion of containers of hazardous materials and searching for patterns, perhaps using neural networks, fuzzy logic and the like, such concentrations of hazardous material can be forecasted prior to the occurrence of a disastrous event. This information can be gleaned from the total picture of movements of containers throughout a local, state or national area. Similarly, the movement of fuel oil and fertilizer by itself is usually not noteworthy but in combination using different vehicles can signal a potential terrorist attack.

Many automobile owners subscribe to a telematics service such as OnStar®. The majority of these owners when queried subscribe so that if they have an accident and the airbag deploys, the EMS personnel will be promptly alerted. This is the most commonly desired feature by such owners. A second highly desired feature relates to car theft. If a vehicle is stolen, the telematics services can track that vehicle and inform the authorities as to its whereabouts. A third highly desired feature is a method for calling for assistance in any emergency such as the vehicle becomes stalled, is hijacked, runs off the road into a snow bank or other similar event. The biggest negative feature of the telematics services such as OnStar® is the high monthly cost of the service.

The invention described here can provide the three above-mentioned highly desired services without requiring a high monthly fee. A simple device that communicates to a satellite or other telematics system can be provided, as described above, that operates either on its own battery or by connecting to the cigarette lighter or similar power source. The device can be provided with a microphone and neural network algorithm that has been trained to recognize the noise signature of an airbag deployment. Thus, if the vehicle is in an accident, the EMS authorities can be immediately notified of the crash along with the precise location of the vehicle. Similarly, if the vehicle is stolen, its exact whereabouts can be determined through an Internet connection, for example. Finally, a discrete button placed in the vehicle can send a panic signal to the authorities via a telematics system. Thus, instead of a high monthly charge, the vehicle owner would only be charged for each individual transmission, which can be as low as $0.20 or a small surcharge can be added to the price of the device to cover such costs through averaging over many users. Such a system can be readily retrofitted to existing vehicles providing most of advantages of the OnStar® system, for example, at a very small fraction of its cost. The system can reside in a "sleep" mode for many years until some event wakes it up. In the sleep mode, only a few microamperes of current are drawn and the battery can last the life of the vehicle. A wake-up can be achieved when the airbag fires and the microphone emits a current. Similarly, a piezogenerator can be used to wake up the system based on the movement of a mass or diaphragm displacing a piezoelectric device which then outputs some electrical energy that can be sensed by the system electronics. Similarly, the system can be caused to wake up by a clock or the reception of a proper code from an antenna. Such a generator can also be used to charge the system battery extending its useful life. Such an OnStar®-like system can be manufactured for approximately $100.

The invention described above can be used in any of its forms to monitor fluids. For example, sensors can be provided to monitor fuel or oil reservoirs, tanks or pipelines and spills. Sensors can be arranged in, on, within, in connection with or proximate a reservoir, tank or pipeline and powered in the manner discussed above, and coupled to a communication system as discussed above. When a property of characteristic of the environment is detected by the sensor, for example, detection of a fluid where none is supposed to be (which could be indicative of a spill), the sensor can trigger a communication system to transmit information about the detection of the fluid to a remote site which could send response personnel, i.e., clean-up personnel. The sensors can be designed to detect any variables which could provide meaningful information, such as a flow sensor which could detect variations in flow, or a chemical sensor which could detect the presence of a harmful chemical, or a radiation sensor which could detect the presence of radioactivity. Appropriate action could be taken in response to the detection of chemicals or radioactivity.

Remote water monitoring is also contemplated in the invention since water supplies are potentially sabotageable, e.g., by the placement of harmful chemicals in the water supply. In this case, sensors would be arranged in, on, within, in connection with or proximate water reservoirs, tanks or pipelines and powered in the manner discussed above, and coupled to a communication system as discussed above. Information provided by the sensors is periodically communicated to a remote site at which it is monitored. If a sensor detects the presence of a harmful chemical, appropriate action can be taken to stop the flow of water from the reservoir to municipal systems.

Even the pollution of the ocean and other large bodies of water especially in the vicinity of a shore can now be monitored for oil spills and other occurences.

Similarly, remote air monitoring is contemplated within the scope of the invention. Sensors are arranged at sites to monitor the air and detect, for example, the presence of radioactivity and bacteria. The sensors can send the information to a communication system which transmits the information to a remote site for monitoring. Detection of aberrations in the information from the sensors can lead to initiation of an appropriate response, e.g., evacuation in the event of radioactivity detection.

An additional application is the monitoring of borders such as the on between the United States and Mexico. Sensors can be placed periodically along such a border at least partially in the ground that are sensitive to vibrations, infrared radiation, sound or other disturbances. Such sensor systems can also contain a pattern recognition system that is trained to recognize characteristic signals indicating the passing of a person or vehicle. When such a disturbance occurs, the system can "wake-up" and receive and analyze the signal and if it is recognized, a transmission to a communication system can occur. Since the transmission would also contain either a location or an identification number of the device, the authorities would know where the border infraction was occurring.

Above, the discussion of the invention has included the use of a location determining signal such as from a GPS or other location determining system such as the use of time of arrival calculations from receptions from a plurality of cell phone antennas. If the device is located in a fixed place where it is unlikely to move, then the location of that place need only be determined once when the sensor system is put in place. The identification number of the device can then be associated with the device location in a database, for example. Thereafter, just the transmission of the device ID can be used to positively identify the device as well as its location. Even for movable cargo containers, for example, if the container has not moved since the last transmission, there is no need to expend energy receiving and processing the GPS or other location determining signals. If the device merely responds with its identification number, the receiving facility knows its location. The GPS processing circuitry can be reactivated if sensors on the asset determine that the asset has moved.

Once the satellite or other communication system has received a message from the sensor system of this invention, it can either store the information into a database or, more commonly, it can retransmit or make available the data usually on the Internet where subscribers can retrieve the data and use it for their own purposes. Since such sensor systems are novel to this invention, the transmission of the data via the Internet and the business model of providing such data to subscribing customers either on an as-needed bases or on a push basis where the customer receives an alert is also novel. Thus, for example, a customer may receive an urgent automatically-generated e-mail message or even a pop-up message on a particular screen that there is a problem with a particular asset that needs immediate attention. The customer can be a subscriber, a law enforcement facility, or an emergency services facility, among others.

Although several preferred embodiments are illustrated and described above, there are possible combinations using other geometries, sensors, materials and different dimensions for the components that perform the same functions. This invention is not limited to the above embodiments and should be determined by the following claims.

I claim:

1. An asset including an arrangement for monitoring the asset and an interior of the asset, comprising:

an interior sensor system arranged on the asset, said interior sensor system being arranged to obtain information about contents in the interior of the asset different than the location of the asset and the contents thereof;

a location determining system arranged on the asset, said location determining system being arranged to monitor the location of the asset; and a communication system arranged on the asset and coupled to said interior sensor system and said location determining system, said communication system being arranged to transmit the information about the contents in the interior of the asset and the location of the asset to a remote facility, said interior sensor system comprising at least one wave receiver arranged to receive waves from the interior of the asset and a processor arranged to compare waves received by said at least one wave receiver at different times and obtain information about the contents in the interior of the asset based on the comparison of the waves received by said at least one wave receiver at different times.

2. The asset of claim 1, wherein said interior sensor system further comprises at least one wave transmitter arranged to transmit waves into the interior of the asset.

3. The asset of claim 2, further comprising
a door; and
a door status sensor arranged to detect when said door is closed, said interior sensor system being coupled to said door status sensor and arranged to cause said at least one wave receiver to receive waves from the interior of the asset only when said door status sensor detects when said door is closed after having been opened.

4. The asset of claim 3, wherein said at least one wave transmitter is coupled to said door status sensor and arranged to transmit waves into the interior of the asset only when said door status sensor detects when said door is closed after having been opened.

5. The asset of claim 2, further comprising
at least one light-detecting sensor arranged to detect any change in light in the interior of the asset, said at least one light-detecting sensor being arranged to cause said at least one wave transmitter to transmit waves into the interior of the asset only when a change in light is detected.

6. The asset of claim 2, wherein said processor is arranged to compensate for thermal gradients in the interior of the asset.

7. The asset of claim 1, wherein said interior sensor system is arranged to determine the presence of objects in the interior of the asset.

8. The asset of claim 1, wherein said interior sensor system comprises at least one imager arranged to obtain images of the interior of the asset.

9. The asset of claim 8, wherein said interior sensor system further comprises a processor embodying a trained pattern recognition system for obtaining information about the contents of the images obtained by said at least one imager.

10. The asset of claim 1, wherein said interior sensor system is arranged to detect motion within the interior of the asset relative to the asset.

11. The asset of claim 10, further comprising an inertial device coupled to said interior sensor system and arranged to detect movement of the asset, said interior sensor system receiving information about movement of the asset and analyzing the movement of the asset in conjunction with the detected motion within the interior of the asset relative to the asset to ascertain whether the detected motion is caused by the movement of the asset or by independent movement of the contents in the interior of the asset.

12. The asset of claim 1, wherein said interior sensor system comprises at least one chemical sensor.

13. The asset of claim 1, wherein said interior sensor system comprises a sensor selected from a group consisting of a temperature sensor, a pressure sensor, a carbon dioxide sensor, a humidity sensor, a hydrocarbon sensor, a narcotics sensor, a mercury vapor sensor, a radioactivity sensor, a microphone, an electromagnetic wave sensor, electric or magnetic field sensor and a light sensor.

14. The asset of claim 1, wherein said interior sensor system comprises an initiation device for periodically initiating said interior sensor system to obtain information about the contents in the interior of the asset, said initiation device being arranged to cause said at least one wave receiver to receive waves from the interior of the asset at periodic intervals.

15. The asset of claim 14, further comprising a wakeup sensor system for detecting the occurrence of an internal or external event, or the absence of an event for a time period, requiring a change in the frequency of monitoring of the interior of the asset, said initiation device being coupled to said wakeup sensor system and being arranged to change the rate at which it initiates said interior sensor system to obtain information about the contents in the interior of the asset in response to the detected occurrence of an internal or external event by said wakeup sensor system.

16. The asset of claim 1, further comprising a motion or vibration detection system arranged to detect motion or vibration of the asset or a part thereof, said interior sensor system being coupled to said motion or vibration detection system and being arranged to detect information about the contents of the interior of the asset by causing said at least one wave receiver to receive waves from the interior of the asset only after the asset or a part thereof is determined to have moved from a stationary position or vibrated.

17. The asset of claim 1, further comprising a wakeup sensor system for detecting the occurrence of an internal or external event relating to the condition or location of the asset, said communication system being coupled to said wakeup sensor system and being arranged to transmit a signal relating to the detected occurrence of an internal or external event.

18. The asset of claim 1, further comprising a memory unit for storing data relating to the location of the asset and the contents in the interior of the asset.

19. The asset of claim 18, further comprising:
a door; and
a door status sensor arranged to detect when said door is closed.

20. The asset of claim 19, wherein said memory unit is arranged to store data relating to the opening and closing of the door in conjunction with the location of the asset and the contents in the interior of the asset.

21. The asset of claim 1, further comprising a motion sensor arranged on the asset for monitoring motion of the asset or a part thereof.

22. The asset of claim 21, further comprising an alarm or warning system coupled to said motion sensor and which is activated when said motion sensor detects dangerous motion of the asset.

23. The asset of claim 1, wherein said interior sensor system comprises at least one weight sensor for measuring the weight of the contents of the asset or the distribution of weight in the interior of the asset.

24. The asset of claim 1, further comprising at least one environment sensor arranged on the asset to measure a property of the environment in which the asset is situated.

25. The asset of claim 1, wherein said interior sensor system comprises a radio frequency transmitter and receiver unit arranged to transmit signals into the interior of the asset and receive signals from RFID or SAW devices present in the interior of the asset.

26. The asset of claim 1, wherein said interior sensor system comprises an optical barcode reader arranged to transmit light into the interior of the asset and receive light reflected from any barcodes present on objects in the interior of the asset.

27. The asset of claim 1, further comprising an exterior monitoring system for monitoring the area in the vicinity of the asset.

28. The asset of claim 27, wherein said exterior monitoring system comprises a sensor selected from a group consisting of an ultrasound sensor, an imager such as a camera both with and without illumination including visual, infrared or ultraviolet imagers, scanners, other types of sensors which sense other parts of the electromagnetic spectrum, capacitive sensors, electric or magnetic field sensors, and chemical sensors.

29. The asset of claim 1, wherein said interior sensor system utilizes a trained pattern recognition technique.

30. The asset of claim 1, wherein said interior sensor system comprises at least one sensor having a diagnostic capability.

31. The asset of claim 1, wherein said interior sensor system, said location determining system and said communication system have low power requirements.

32. The asset of claim 1, further comprising a battery coupled to said interior sensor system, said location determining system and said communication system for providing power to said interior sensor system, said location determining system and said communication system when needed.

33. The asset of claim 32, wherein said battery is rechargeable.

34. An arrangement for monitoring an asset, comprising:
a location determining system adapted to be arranged on the asset, said location determining system being arranged to monitor the location of the asset;
at least one environment sensor adapted to be arranged on the asset, said at least one environment sensor being arranged to obtain information about the environment in which the asset is located different than the location of the asset;
a communication system adapted to be arranged on the asset and coupled to said at least one environment sensor and said location determining system, said communication system being arranged to transmit the information about the location of the asset and the environment in which the asset is located to a remote facility,
said at least one environment sensor comprising at least one wave receiver arranged to receive waves from an area in a vicinity of the asset and a processor arranged to analyze waves received by said at least one wave receiver and obtain information about the environment in which the asset is located based on the waves received by said at least one wave receiver.

35. A method for monitoring movable assets and contents in the assets; comprising the steps of:
assigning a unique identification code to each asset;
determining the location of each asset;
assigning an event to initiate a determination of at least one property or characteristic of the contents of each asset, the at least one property or characteristic being different than the location of the asset;
detecting the event;
determining the at least one property or characteristic of the contents of each asset only after detection of the event assigned to that asset; and
after detection of the event and the determination of the at least one property of characteristic of the contents of the asset, transmitting the location of each asset along with the determined at least one property or characteristic of the contents of the asset to a data processing facility to form a database of information about the use of the assets or to retransmit the data to another location.

36. The method of claim 35, wherein the step of determining at least one property or characteristic of the contents of each asset comprises the step of determining the weight of the contents of the asset and/or determining the weight distribution of the contents of the asset.

37. The method of claim 36, further comprising the step of determining the weight of an asset and/or determining the weight distribution of an asset utilizing the determined weight of the contents of the asset and/or the determined weight distribution of the contents of the asset and the known weight and weight distribution of the asset without contents.

38. The method of claim 35, further comprising the steps of:
arranging at least one sensor on each asset to determine a condition of the environment in the vicinity of the asset; and
transmitting the condition of the environment in the vicinity of the assets to the data processing and facility for inclusion in the database or retransmission to another location.

39. The method of claim 38, further comprising the step of constructing the at least one sensor to measure or detect at least one of the exposure of the asset to excessive heat, exposure of the asset to excessive cold, vibrations of the asset, exposure of the asset to water and exposure of the asset to hazardous material.

40. The method of claim 35, further comprising the steps of:
arranging at least one sensor on each asset to determine a condition of the environment of the interior of the asset; and
transmitting the condition of the environment of the interior of the assets to the data processing facility for inclusion in the database or retransmission.

41. The method of claim 40, further comprising the step of constructing the at least one sensor to measure or detect at least one of the presence of excessive heat in the interior of the asset, the presence of excessive cold in the interior of the asset, vibrations of the asset, the presence of water in the interior of the asset and the presence of hazardous material in the interior of the asset.

42. The method of claim 35, further comprising the steps of:
providing a responsive identification tag on individual cargo items at least when present in one of the assets;
arranging an initiation and reception device on each asset to cause the identification tag on each cargo item in the asset to generate a responsive signal containing data on the cargo item when initiated by the initiation and reception device;
periodically initiating the initiation and reception device;
receiving the responsive signals from the cargo items after initiation of the initiation and reception device to thereby obtain information about the identification of the cargo items; and
transmitting information about the identification of the cargo items to the data processing facility for inclusion in the database or retransmission.

43. The method of claim 42, further comprising the steps of:
comparing the information about the identification of the cargo items received from each asset to pre-determined information about the identification of the cargo items in that asset; and generating an alert upon the detection of differences between the information about the identification of the cargo items received from each asset and the pre-determined information about the identification of the cargo items in that asset.

44. The method of claim 35, further comprising the step of providing a memory unit on each asset and storing the information about the location of each asset along with the at least one property or characteristic of the contents of the asset in the memory unit.

45. The method of claim 35, further comprising the steps of:

providing an optically readable identification code on individual cargo items at least when present in one of the assets;

arranging an initiation and reception device on each asset to cause the identification code on each cargo items in the asset to provide a responsive pattern of light containing data on the cargo item when initiated by the initiation and reception device;

periodically initiating the initiation and reception device when the cargo items are in a position to direct light to the identification code on the cargo item;

receiving the responsive patterns of light from the cargo items after initiation of the initiation and reception device to thereby obtain information about the identification of the cargo items; and transmitting information about the identification of the cargo items to the data processing facility.

46. The method of claim 45, further comprising the steps of:

comparing the information about the identification of the cargo items received from each asset to pre-determined information about the identification of the cargo items in that asset; and generating an alert upon the detection of differences between the information about the identification of the cargo items received from each asset and the pre-determined information about the identification of the cargo items in that asset.

47. The method of claim 35, wherein each asset has at least one door, further comprising the steps of:

detecting openings and/or closing of the at least one door of each asset; and transmitting the information about the openings and closings of the at least one door to the data processing facility.

48. The method of claim 35, wherein each asset has at least one door, the assigned event being openings or closings of the at least one door.

49. The method of claim 35, further comprising the steps of:

obtaining information about an implement or individual moving the asset; and transmitting the information about the implement or individual moving the asset to the data processing facility.

50. A method for monitoring movable assets and contents in the assets; comprising the steps of:

mounting a replaceable cell phone or PDA having a location providing function and a low duty cycle to the asset;

determining the location of the asset;

determining information about the contents of the asset other than the location of the asset, said information determining step comprising the steps of arranging at least one wave receiver on the asset in a position to receive waves from the interior of the asset and comparing waves received by the at least one wave receiver at different times such that the information about the contents of the asset are obtained based on the comparison of the waves received by the at least one wave receiver at different times;

enabling communications between the cell phone or PDA and the asset to enable the cell phone or PDA to obtain the determined location of the asset and the determined information about the contents of the asset; and establishing a communications channel between the cell phone or PDA and a location remote from the asset to enable the information about the asset and its contents to be transmitted to the remote location.

51. The method of claim 50, wherein the cell phone or PDA obtains an identification number from the asset.

52. The method of claim 50, further comprising the step of coupling the cell phone or PA to a battery fixed to the asset.

53. The method of claim 50, wherein a cell phone is mounted to the asset, the cell phone having a sound-receiving component, further comprising the step of providing a pattern recognition system in the cell phone to recognize events relating to the asset based on sounds received by the sound-receiving component.

54. The asset of claim 1, further comprising an event monitoring sensor coupled to said processor for monitoring an event related to the asset, said processor being arranged to cause said at least one wave receiver to receive waves from the interior of the asset only when said event monitoring sensor detects occurrence of the event.

55. An asset including an arrangement for monitoring the asset and an interior of the asset, comprising:

an interior sensor system arranged on the asset, said interior sensor system being arranged to obtain information about contents in the interior of the asset different than the location of the asset and the contents thereof, said interior sensing system including at least one sensor arranged to periodically determine a property or characteristic of the contents in the interior of the asset, an event monitoring sensor arranged to monitor an event related to the asset and a processor coupled to said at least one sensor and said event monitoring sensor and arranged to cause said at least one sensor to determine the property or characteristic of the contents in the interior of the asset only when said event monitoring sensor detects occurrence of the event;

a location determining system arranged on the asset, said location determining system being arranged to monitor the location of the asset; and a communication system arranged on the asset and coupled to said interior sensor system and said location determining system, said communication system being arranged to transmit the information about the contents in the interior of the asset and the location of the asset to a remote facility.

* * * * *